(12) United States Patent
Yoshii et al.

(10) Patent No.: US 7,224,407 B2
(45) Date of Patent: May 29, 2007

(54) COLOR DEMODULATION DEVICE, COLOR DEMODULATION METHOD AND IMAGE DISPLAY DEVICE

(75) Inventors: Hideki Yoshii, Tokyo (JP); Masaki Yamakawa, Tokyo (JP); Jun Someya, Tokyo (JP); Yoshiaki Okuno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 681 days.

(21) Appl. No.: 10/188,958

(22) Filed: Jul. 5, 2002

(65) Prior Publication Data
US 2003/0035068 A1 Feb. 20, 2003

(30) Foreign Application Priority Data
Jul. 6, 2001 (JP) ............................. 2001-205932

(51) Int. Cl.
*H04N 9/66* (2006.01)
(52) U.S. Cl. ...................... 348/638; 348/639; 348/505; 348/507
(58) Field of Classification Search ........ 348/638–639, 348/640, 641, 505–507, 508–509, 727; *H04N 9/66*
See application file for complete search history.

(56) References Cited
U.S. PATENT DOCUMENTS 5,459,524 A * 10/1995 Cooper ....................... 348/507
5,589,877 A * 12/1996 Ikuzawa et al. ............. 348/186
5,600,379 A *  2/1997 Wagner ....................... 348/497
5,654,767 A *  8/1997 Ikeda et al. .................. 348/638
5,815,220 A *  9/1998 Marshall ...................... 348/727
6,064,442 A *  5/2000 Aihara ......................... 348/507
6,538,702 B1 * 3/2003 Taketani et al. ............. 348/638
6,690,430 B1 * 2/2004 Takeshita .................... 348/638
6,833,875 B1 * 12/2004 Yang et al. .................. 348/665

FOREIGN PATENT DOCUMENTS
JP           11-298913        10/1999

* cited by examiner

*Primary Examiner*—Trang U. Tran
(74) *Attorney, Agent, or Firm*—Birch, Stewart, Kolasch & Birch, LLP

(57) ABSTRACT

A color demodualation device having an AD converter, a phase signal generator, a burst data generator and a multiplier. The AD converter produces digital samples of chrominance signal at a frequency four times a color subcarrier frequency, and the phase signal generator generating a phase signal for identifying phases of a burst signal and color subcarrier signals modulated by respective B-Y and R-Y signals. The burst data generator produce burst data corresponding to the burst signals modulated by respective B-Y and R-Y signals. The burst respective color subcarrier signals according to the phase signal. The multiplier produces products of the burst data and the digital samples of the chrominance signal, from which digital samples of the respective R-Y and B-Y signals are produced.

18 Claims, 20 Drawing Sheets

BURST SIGNAL   $A\sin\omega t$

B-Y SIGNAL   $-B\sin\omega t$

R-Y SIGNAL   $-R\cos\omega t$

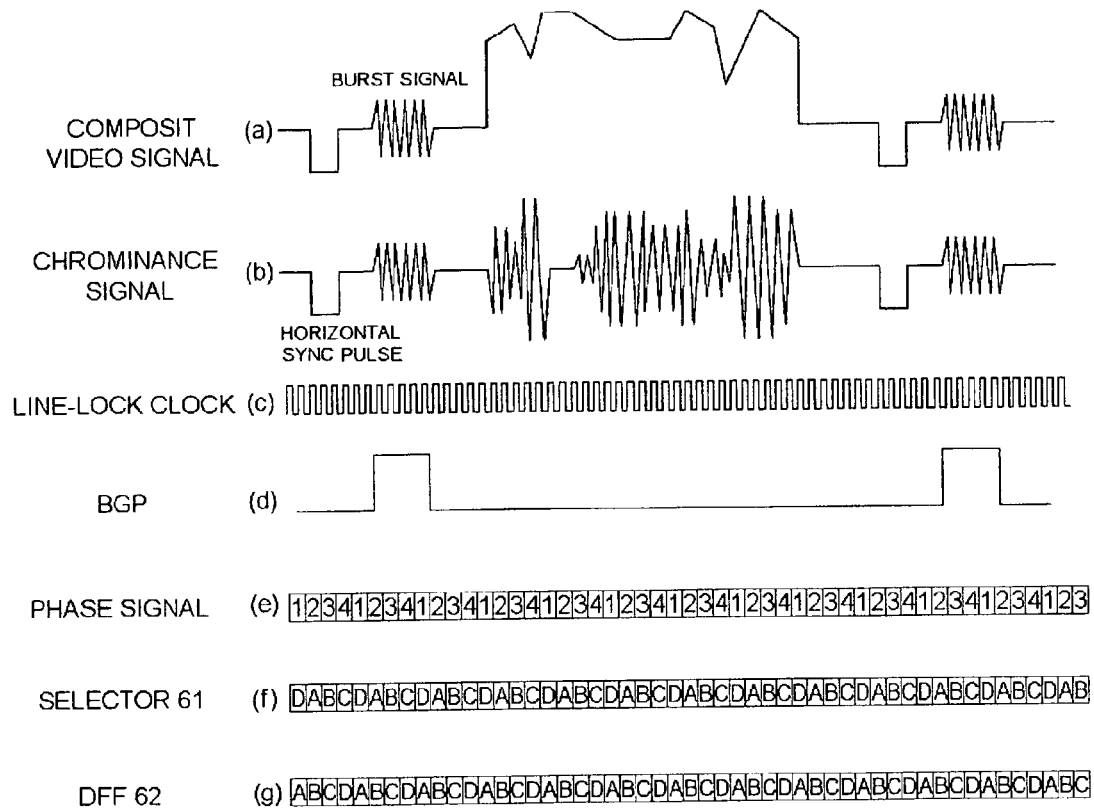
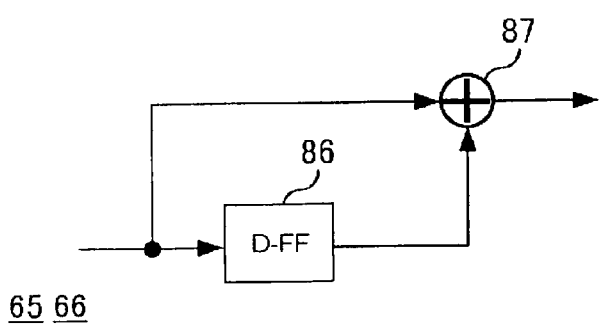

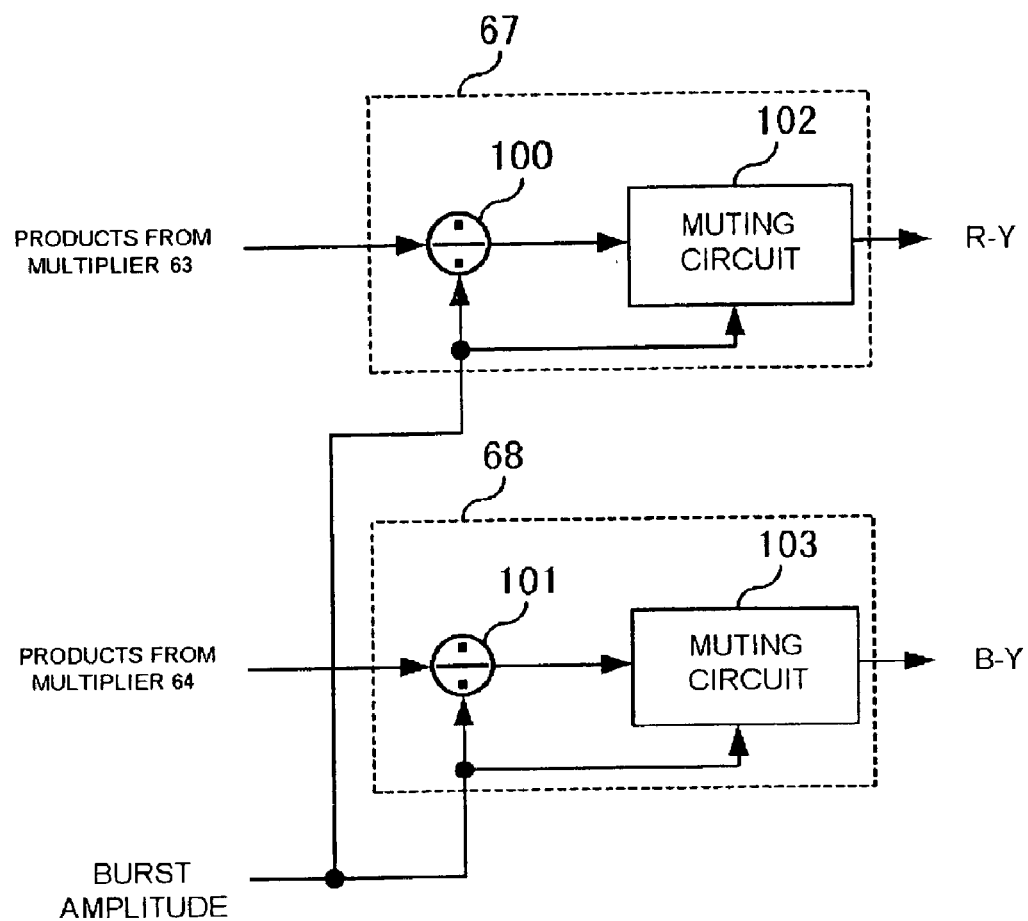

COLOR DEMODULATION DEVICE, COLOR DEMODULATION METHOD AND IMAGE DISPLAY DEVICE

BACKGROUND OF THE INVENTION

1. Field of the Invention

The present invention relates to a color demodulation device and method for reproducing color difference signals included in a television signal, namely R-Y and B-Y signals. The present invention also relates to an image display device including the color demodulation device so as to produce color image.

2. Description of the Related Art

To produce color image from an analog video signal, for example, the composite video signal, an image display device includes a color demodulation device. The color demodulation device reproduces R-Y and B-Y signals from a chrominance signal included in the composite video signal. The chrominance signal is a sum of color subcarrier signals modulated by the respective R-Y and B-Y signals, and these color subcarrier signals are 90° out of phase each other. The color subcarrier frequency (fsc) is approximately 3.58 MHz. The chrominance signal includes a burst signal consisting of at least eight cycles of the color subcarrier signals, which is 90° out of phase with respect to the color subcarrier signal modulated by the R-Y signal and is 180° out of phase with respect to the color subcarrier signal modulated by the B-Y signal, as shown in FIG. 1. In a conventional color demodulation device, the chrominance signal is sampled at the timing of a burst-lock clock signal, that is a 4 fsc clock signal synchronized with the burst signal. As shown in FIG. 1, the chrominance signal is sampled at each peak of the color subcarrier signals modulated by the respective R-Y and B-Y signals, thereby alternatively producing digital samples of the R-Y and B-Y signals.

The burst signal is not necessarily in phase with the horizontal sync signal HD. Therefore, the digital samples of the respective R-Y and B-Y signals, which are produced at the timing of the burst-lock clock signal, need to be sampled again at the timing of a clock signal synchronized with the horizontal synch signal HD. In other words, the image display device with the conventional color demodulation device requires another clock signal synchronized with the horizontal synch signal HD, as shown in FIG. 2. The sync filter 1 extracts a vertical sync signal VD and the horizontal sync signal HD from the composite video signal. The line-lock clock generator 4 generates a line-lock clock signal synchronized with the horizontal sync signal HD. The line-lock clock signal is supplied to three sets of AD converters 8, a matrix/image processor 11, and a display 10. The display 10 may be a liquid crystal panel (LCD), a cathode ray tube, or a plasma display panel (PDP).

The burst signal filter 3 extracts the burst signal from the composite color video signal. The burst-lock clock generator 22 generates the burst-lock clock signal based on the burst signal extracted by the burst signal filter 3. The burst-lock clock signal is supplied to an AD converter 20, a YC filter 21, a color modulator 23, and three sets of DA converters.

The AD converter 20 samples the composite video signal using the burst-lock clock signal as a sampling clock. The YC filter 21 separates digital samples of a luminance signal (Y) and a chrominance signal (C) included in the digital samples of the composite video signal. The color demodulator 23 produces the digital sample of the respective R-Y and B-Y signals from the digital samples of the chrominance signal. The digital samples of the respective R-Y, B-Y and Y signals are converted to analog signals by the DA converters 24. The AD converters 8 sample the analog signals produced by the DA converters 24 at the timing of the line-lock clock signal, thereby producing the digital signals of the R-Y and B-Y and Y signals synchronized with the line-lock clock signal. The matrix/image processor 11 converts the digital samples of the R-Y, B-Y and B-Y signals into that of R, G, and B signals. Such a structure shown in FIG. 2, using two clock signals, i.e. the burst-lock clock and line-lock clock signals, appears in Japanese Patent Laid-Open No. 298913/1999.

As discussed above, in the conventional color demodulation device, the chrominance signal has to be sampled at the timing of the burst-lock clock signal, which is precisely synchronized with the burst signal. In other words, if a phase of the burst-lock clock signal deviates from that of the burst signal, the digital samples of the R-Y and B-Y signal will not be produced accurately. Furthermore, the image display device with the conventional color demodulation method requires two different clock signal generators, which not only increase circuit size but also cause noise resulting from interference of different clocks.

SUMMARY OF THE INVENTION

It is therefore, a primary object of the invention to provide a color demodulation device and method which is capable of producing digital samples of the respective R-Y and B-Y signals without the burst-lock clock signal. This object is achieved in accordance with one aspect of the present invention which is a color demodulation device having an AD converter, a phase signal generator, a burst data generator and a multiplier. The AD converter produces digital samples of chrominance signal at a frequency four times a color subcarrier frequency, and the phase signal generator generating a phase signal for identifying phases of a burst signal and color subcarrier signals modulated by respective B-Y and R-Y signals. The burst data generator produce burst data corresponding to the burst signals which have predetermined phase relationships with the respective color subcarrier signals according to the phase signal. The multiplier produces products of the burst data and the digital samples of the chrominance signal, from which digital samples of the respective R-Y and B-Y signals are produced.

Another aspect of the present invention is a color demodulation method for producing digital samples of the respective R-Y and B-Y signals from products obtained by multiplying digital samples of the chrominance signal produced at a frequency four times a color subcarrier frequency by burst data. The burst data are digital samples corresponding to burst signals having predetermined phase relationships with the respective color subcarrier signals modulated by the respective R-Y and B-Y signals.

BRIEF DESCRIPTION OF THE DRAWINGS

FIGS. 4, 6, and 14 are diagrams showing signal waveforms or data represented by signals for explaining the operation of the color demodulation device according to the first embodiment.

FIGS. 5, 7, 8, 9, 10, 11, 12 and 13 are block diagrams showing various portions of the image display device shown in FIG. 1.

DETAILED DESCRIPTION OF THE PREFERRED EMBODIMENTS

First Embodiment

Figure 1:
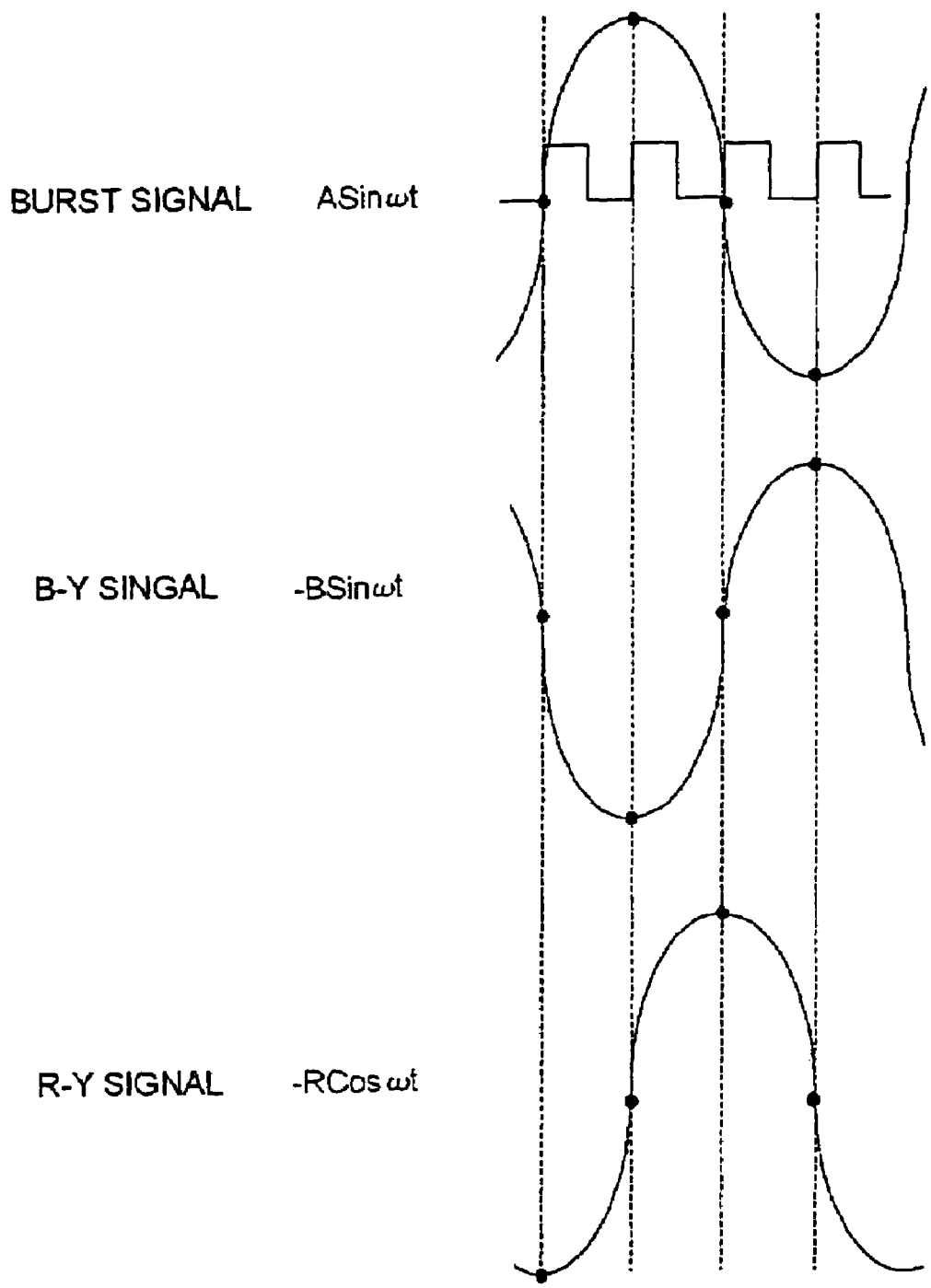
FIG. 1 is a diagram for explaining a conventional color demodulation process.
Figure 2:
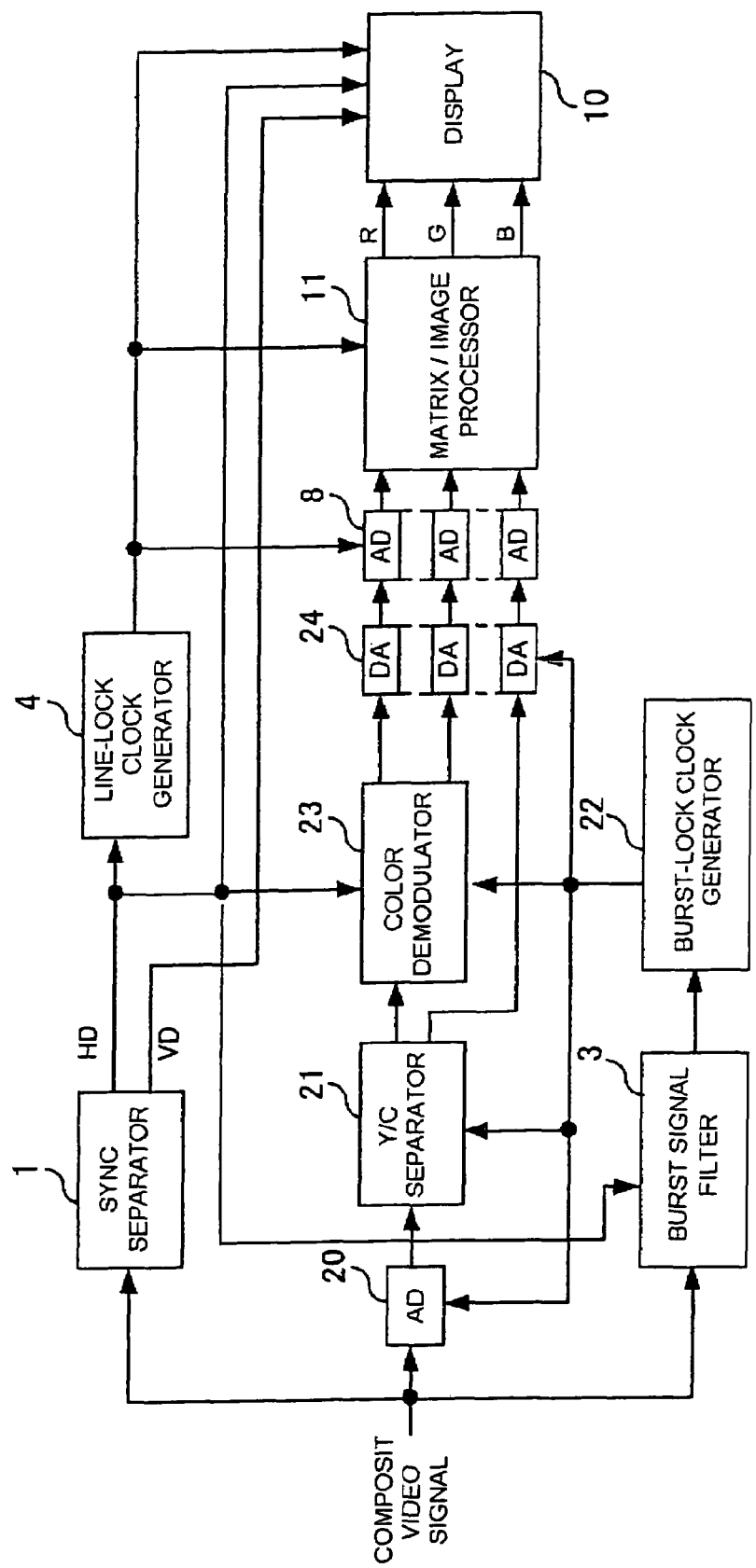
FIG. 2 is a block diagram illustrating a structure of a display device including a conventional color demodulation device.
Figure 3:
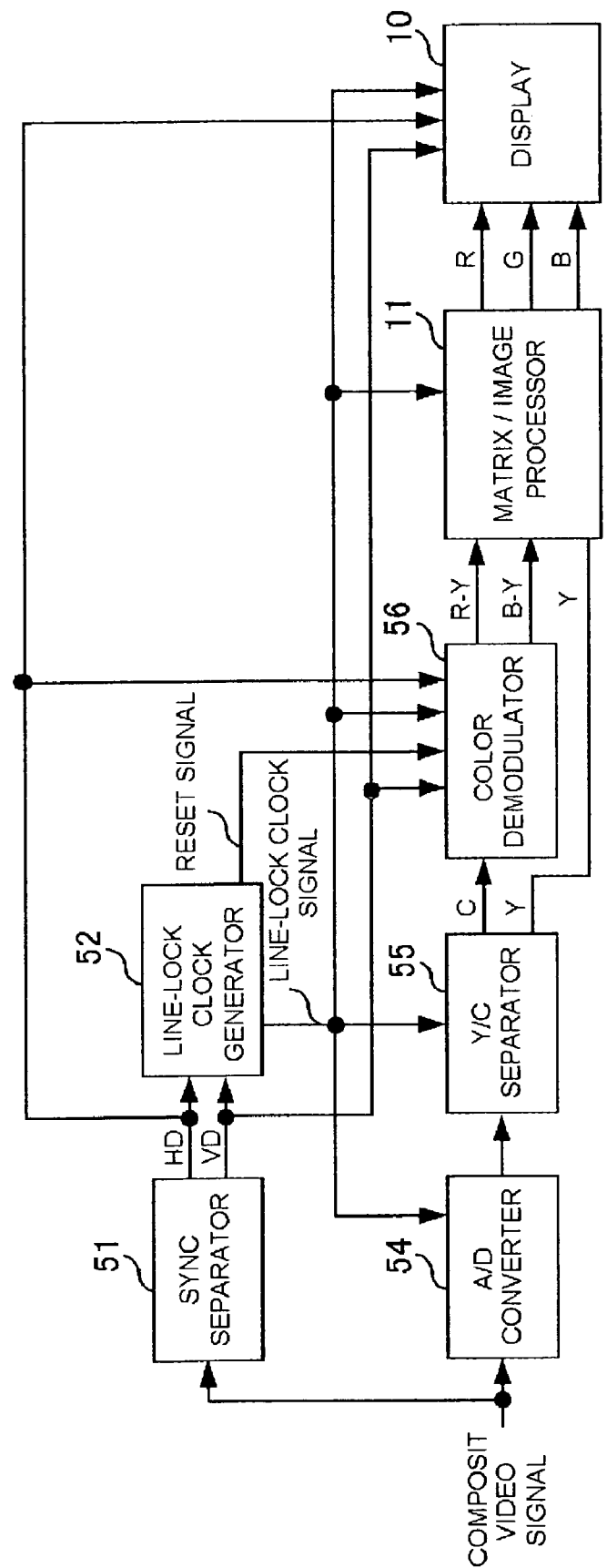
FIG. 3 is a block diagram illustrating a structure of a display device including a color demodulation device according to the first embodiment.

FIG. 3 is a block diagram illustrating a structure of an image display device having a color demodulation device according to the first embodiment of the present invention. The color demodulation device and method described below can be implemented by a circuit including discrete elements or an IC, as well as software.

A sync separator 51 extracts a vertical sync signal VD and a horizontal sync signal HD from a composite color video signal, which is shown in FIG. 6(a). A line-lock clock generator 52 generates a line-lock clock signal. The line-lock clock signal is a 4 fsc (frequency four times a color subcarrier frequency, approximately 3.58 MHz) clock signal synchronized with the horizontal sync signal HD. The line-lock clock generator 52 also generates a reset signal, which occurs at the timing of the vertical sync signal VD.

An AD converter 54 samples the composite color video signal at 4 fsc by using the line-lock clock signal as a sampling clock. A YC separator 55 separates digital samples Y representing a luminance signal and digital samples C representing a chrominance signal both of which art included in the digital samples of the composite video signal. The digital samples C are sent to a color demodulator 56, and the digital samples Y are sent to a matrix/image processor 11.

The color demodulator 56 produces digital samples R-Y and B-Y, which represent R-Y and B-Y signals, respectively. The matrix/image processor 11 receives the digital samples R-Y, B-Y and Y and develops R, G, and B signals using conventional method. The matrix/image processor 11 also performs image processing such as OSD (on-screen display) processing and contrast adjustment. The display 10 presents color image based on the R, G, and B signals.

Figure 4:
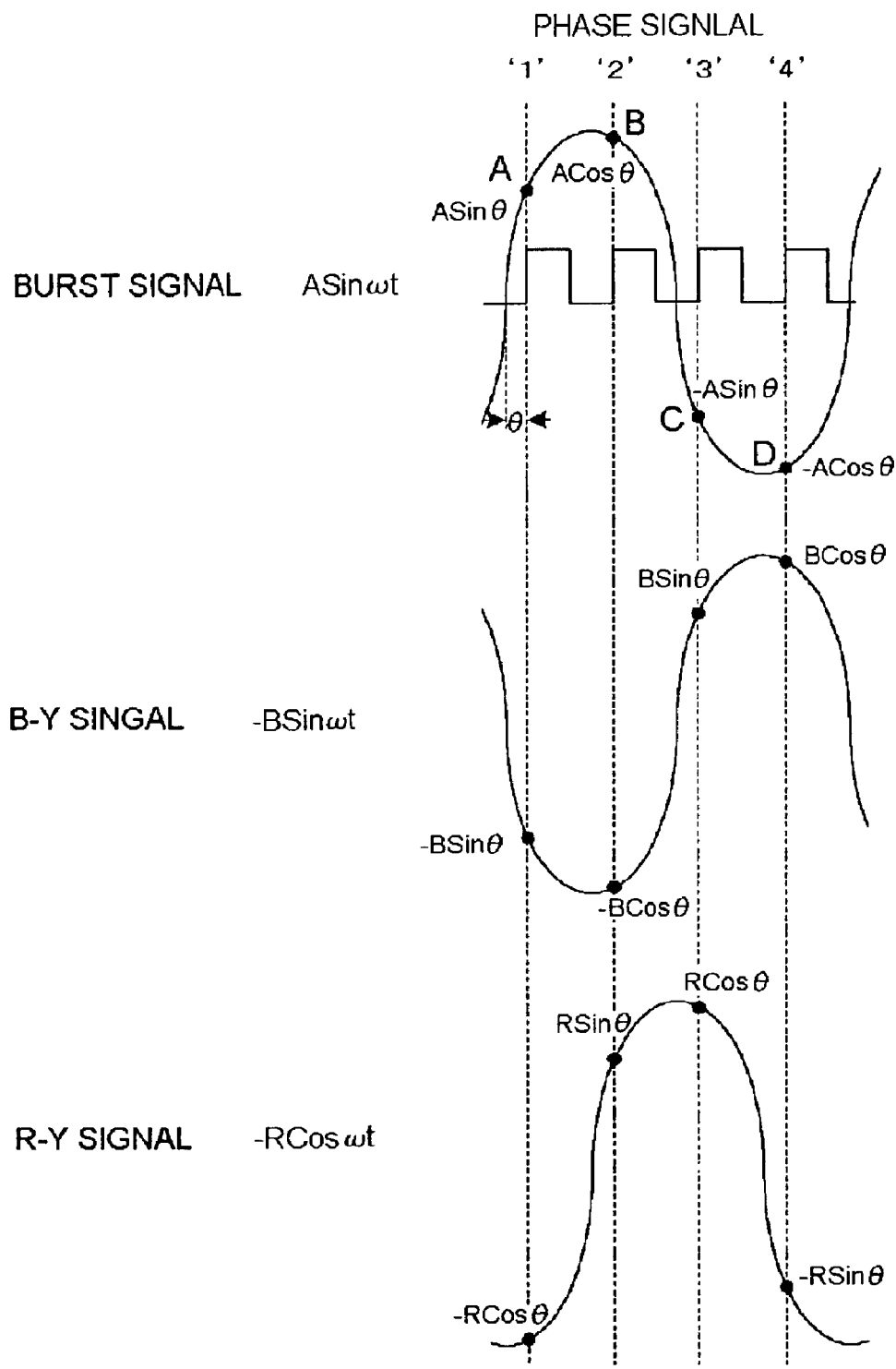

As shown in FIG. 6(a) or (b), the chrominance signal includes a burst signal, which can be expressed as E sin ωt, where E is an amplitude of the burst signal, herein after referred to as burst amplitude. As shown in FIG. 4, the color subcarrier signals modulated by the B-Y and R-Y signals lag the burst signal by 90° and 180°, respectively. Therefore, the color subcarrier signals modulated by the respective B-Y and R-Y signals can be expressed as −B sin ωt and −R cos ωt, respectively, where B and R are amplitudes of the B-Y and R-Y signal. And furthermore, the chrominance signal consisting of these color subcarrier signals, −B sin ωt and −R cos ωt, can be expressed as −(B sin ωt+R cos ωt).

The amplitudes B and R vary with time, they can however be regarded as constants in several cycles of the color subcarrier signal, since frequency bands of the B-Y and R-Y signals are sufficiently lower than color subcarrier frequency.

Since the line-lock clock signal has frequency four times the color subcarrier frequency, the interval between each sampling point is equal to 90° phase angle of the burst signal. Therefore, phase angles of four consecutive sampling points can be expressed as θ, θ+90°, θ+180°, and θ+270°, where θ is a phase difference between the line-lock clock signal and the burst signal.

Accordingly, the digital samples C at θ, θ+90°, θ+180°, and θ+270° are expressed as −(B sin θ+R cos θ), (B cos θ−R sin θ), −(B sin θ+R cos θ), and −(B sin θ−R cos θ), respectively. At the same time, sample values of the burst signal at θ, θ+90°, θ+180°, and θ+270°, herein after referred to as burst data A, B, C and D, are expressed as follows:

$$\text{burst data } A = E \sin \theta \quad (1)$$

$$\text{burst data } B = E \sin(\theta+90°) = E \cos \theta \quad (2)$$

$$\text{burst data } C = E \sin(\theta+180°) = -E \sin \theta \quad (3)$$

$$\text{burst data } D = E \sin(\theta+270°) = -E \cos \theta \quad (4)$$

By using the burst data, the digital samples B-Y are produced by the process represented by following mathematical operation.

First, the digital samples C are multiplied by the digital samples of the burst signal which is delayed by 180° phase angle with respect to the B-Y signal included in the chrominance signal. This process is performed by multiplying the digital samples of the chromnance signal at θ, θ+90°, θ+180°, and θ+270° by the burst data A, B, C and D, respectively. Products a1, a2, a3 and a4 produced by this process are expressed as follows:

$$a1 = -E \sin \theta (B \sin \theta + R \cos \theta) = -EB \sin^2 \theta - ER \sin \theta \cos \theta \quad (5)$$

$$a2 = -E \cos \theta (B \cos \theta - R \sin \theta) = -EB \cos^2 \theta + ER \sin \theta \cos \theta \quad (6)$$

$$a3 = -E \sin \theta (B \sin \theta + R \cos \theta) = -EB \sin^2 \theta - ER \sin \theta \cos \theta \quad (7)$$

$$a4 = -E \cos \theta (B \cos \theta - R \sin \theta) = -EB \cos^2 \theta + ER \sin \theta \cos \theta \quad (8)$$

Then, the products a1 and a2, a2 and a3, a3 and a4, and a4 and a1 are added together, thereby producing products EB, each of which corresponds to a product of the B-Y signal (B) and the burst amplitude (E) at each of the sampling points. This process is expressed as follows:

$$a1 + a2 = (-EB\sin^2\theta - ER\sin\theta\cos\theta) + \qquad (9)$$
$$(-EB\cos^2\theta + ER\sin\theta\cos\theta)$$
$$= -EB(\sin^2\theta + \cos^2\theta) = -EB.$$

$$a2 + a3 = (-EB\cos^2\theta + ER\sin\theta\cos\theta) + \qquad (10)$$
$$(-EB\sin^2\theta - ER\sin\theta\cos\theta)$$
$$= -EB(\sin^2\theta + \cos^2\theta) = -EB.$$

$$a3 + a4 = (-EB\sin^2\theta - ER\sin\theta\cos\theta) + \qquad (11)$$
$$(-EB\cos^2\theta + ER\sin\theta\cos\theta)$$
$$= -EB(\sin^2\theta + \cos^2\theta) = -EB.$$

$$a4 + a1 = (-EB\cos^2\theta + ER\sin\theta\cos\theta) + \qquad (12)$$
$$(-EB\sin^2\theta - ER\sin\theta\cos\theta)$$
$$= -EB(\sin^2\theta + \cos^2\theta) = -EB.$$

The digital samples B-Y, i.e. the amplitude of the B-Y signal (B), are obtained by dividing each sum of the products, a1+a2, a2+a3, a3+a4 and a1+a4, by the burst amplitude (E).

The digital samples B-Y can also be obtained by multiplying the digital samples C by the digital samples of the burst signal which is in phase with the B-Y signal in the process described above. In this case, the digital samples of the chrominance signal at θ, θ+90°, θ+180°, and θ+270° are multiplied by the burst data C, D, A and B, respectively, thereby producing products corresponding to a1, a2, a3 and a4. With this alternative method, the products EB is obtained without minus sign.

On the other hand, the digital samples R-Y is produced by the process represented by following mathematical operation using the burst data A, B, C and D.

First, the digital samples C are multiplied by the digital samples of the burst signal which is delayed by 180° phase angle with respect to the R-Y signal included in the chrominance signal. This process is performed by multiplying the digital samples C at θ, θ+90°, θ+180°, and θ+270° by the burst data D, A, B and C, respectively. Products b1, b2, b3 and b4 produced by this process are expressed as follows:

$$b1 = -E\cos\theta(B\sin\theta + R\cos\theta) = -EB\sin\theta\cos\theta - ER\cos^2\theta \qquad (13)$$

$$b2 = E\sin\theta(B\sin\theta - R\cos\theta) = EB\sin^2\theta - ER\sin\theta\cos\theta \qquad (14)$$

$$b3 = -E\cos\theta(B\cos\theta + R\sin\theta) = -EB\cos^2\theta - ER\sin\theta\cos\theta \qquad (15)$$

$$b4 = E\sin\theta(B\cos\theta - R\sin\theta) = EB\sin\theta\cos\theta - ER\sin^2\theta \qquad (16)$$

Then, the products b1 and b2, b2 and b3, b3 and b4, and, b4 and b1 are added together, thereby producing products EB each of which corresponds to a product of the R-Y signal (R) and the burst amplitude at each of the sampling points. This process is expressed as follows:

$$b1 + b2 = (-EB\sin\theta\cos\theta - ER\cos^2\theta) + \qquad (17)$$
$$(EB\sin\theta\cos\theta - ER\sin^2\theta)$$
$$= -ER(\sin^2\theta + \cos^2\theta) = -ER.$$

$$b2 + b3 = (EB\sin\theta\cos\theta - ER\sin^2\theta) + \qquad (18)$$
$$(-EB\sin\theta\cos\theta - ER\cos^2\theta)$$
$$= -ER(\sin^2\theta + \cos^2\theta) = -ER.$$

$$b3 + b4 = (-EB\sin\theta\cos\theta - ER\cos^2\theta) + \qquad (19)$$
$$(EB\sin\theta\cos\theta - ER\sin^2\theta)$$
$$= -ER(\sin^2\theta + \cos^2\theta) = -ER.$$

$$b4 + b1 = (-EB\sin\theta\cos\theta - ER\cos^2\theta) + \qquad (20)$$
$$(EB\sin\theta\cos\theta - ER\sin^2\theta)$$
$$= -ER(\sin^2\theta + \cos^2\theta) = -ER.$$

The digital samples R-Y, i.e. the amplitude of the R-Y signal (R), are obtained by dividing each sum of two products b1+b2, b2+b3, b3+b4, and b4+b1 by the burst amplitude (E).

The digital samples R-Y can also be obtained by multiplying digital samples C by the digital samples of the burst signal which is in phase with the B-Y signal in the process described above. In this case, the digital samples C at θ, θ+90°, θ+180°, and θ+270° are multiplied by the burst data D, A, B and C, respectively, thereby producing products corresponding to b1, b2, b3 and b4. With this alternative method, the products EB is obtained without minus sign.

Figure 5:
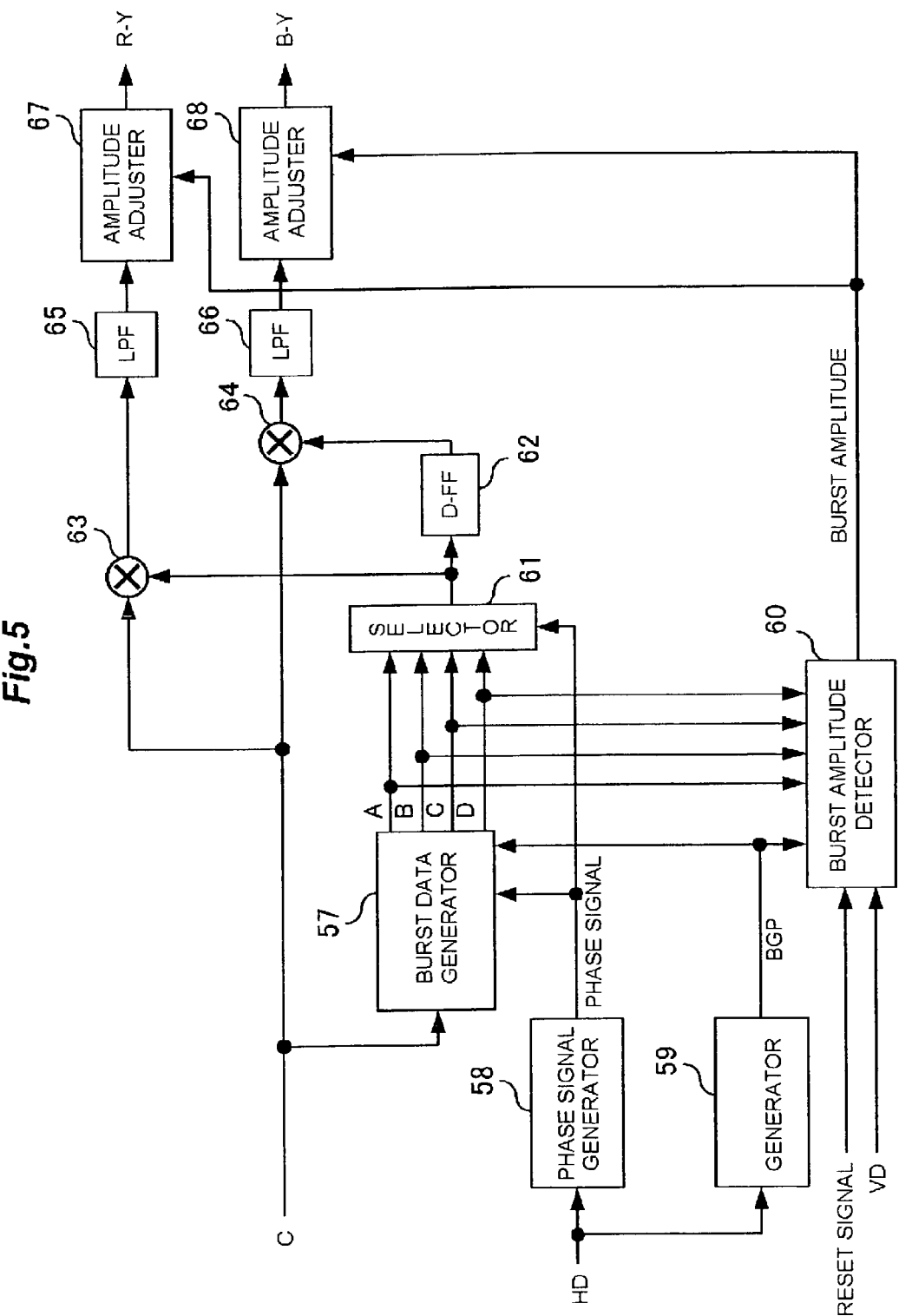

A color demodulation process discussed above is performed by the color demodulator 56. FIG. 5 is a block diagram illustrating an internal structure of the color demodulator 56. As shown in FIG. 6(*e*), a phase signal generator 58 generates a phase signal indicating four phases '1', '2', '3' and '4' which correspond to the phase angles θ, θ+90°, θ+180° and θ+270°, respectively. The phase signal indicates each of the four phases at the timing of the line-lock clock. The phase signal is provided to a burst data generator 57 and a selector 61. A BGP generator 59 generates a burst gate pulse (BGP) including a burst interval, as shown in FIG. 6(*d*).

The burst data generator 57 extracts digital samples of the burst signal included in the digital samples C, and identifies their respective phase angles, according to the phase signal. The digital samples of the burst signal at the respective four phases '1', '2', '3' and '4' correspond to the burst data A, B, C and D. Therefore, the burst data generator 57 produces the burst data A, B, C and D, for example, by averaging those samples at the respective four phases.

The selector 61 selectively outputs the burst data D, A, B, and C according to the phase signal, as shown in FIG. 6(*f*), so as to provide digital samples of the burst data which is 180° out of phase with respect to the R-Y signal to a multiplier. The multiplier 63 derives the products b1, b2, b3 and b4 by multiplying the burst data provided by the selector 61 and the digital samples C. At the same time, a D-type flip flop (D-FF) 62 selectively outputs the burst data A, B, C and D according to the phase signal, as shown in FIG. 6(*g*), so as to provide digital samples of the burst signal 180° out of phase with the B-Y signal to a multiplier 64. The multiplier 63 derives the products a1, a2, a3 and a4 by multiplying the burst data provided by the D-FF 62 and the digital samples C.

The products a1, a2, a3 and a4 derived by the multiplier 64 are sent to a LPF 66, and the products b1, b2, b3 and b4 derived by the multiplier 63 are sent to a LPF 65. FIG. 7 is a block diagram illustrating a structure of each of the LPFs 65 and 66. A D-FF 86 delays each input by one line-lock clock cycle. Accordingly, the products a2, a3, a4 and a1, or b2, b3, b4 and b1 are introduced to one of two inputs of an adder 87, when the products a1, a2, a3 and a4, or b1, b2, b3 and b4, are introduced to another input. The adder 87 produce the product ER or EB by adding incoming inputs a1 and a2, a2 and a3, a3 and a4, and a4 and a1, or b1 and b2, b2 and b3, b3 and b4 and b4 and b1.

The products ER and EB derived by the LPFs 65 and 66 are sent to amplitude adjusters 67 and 68, respectively. The amplitude adjusters 67 and 68 produce the digital samples R-Y and B-Y by dividing the products EB and EB by a burst amplitude E detected by a burst amplitude detector 60. The burst amplitude detector 60 detects the burst amplitude E based on the burst data A, B, C and D.

FIG. 8 is a block diagram illustrating a structure of the amplitude adjusters 67 and 68. Dividers 100 and 101 divide the products EB and EB by the burst amplitude E, thereby producing the digital samples R-Y and B-Y. Outputs of the divider 100 and 101, i.e. the digital samples R-Y and B-Y, are sent to muting circuits 102 and 103, respectively. The muting circuits 102 and 103 shut off the outputs of the divider 102 and 103 when the burst amplitude E is smaller than a predetermined value, thereby performing a color killer process.

Detailed structures of the burst data generator 57, the line-lock clock generator 52, and the burst amplitude detector 60 will be described below.

Figure 9:
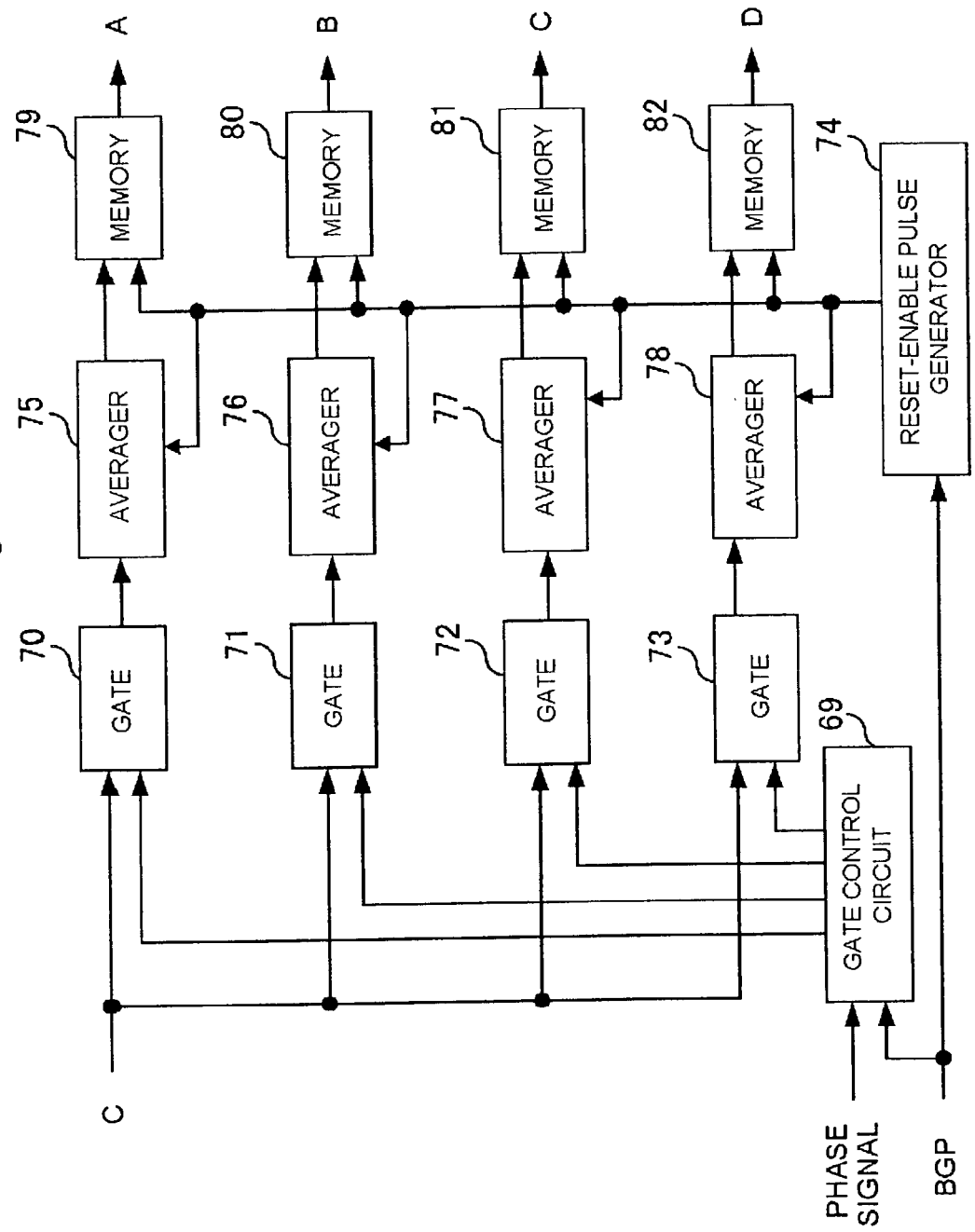

FIG. 9 is a block diagram illustrating a structure of the burst data generator 57. During the burst interval, a gate control circuit 69 outputs enable signals to gates 70, 71, 72 and 73 according to the phase signal. More specifically, the gate control circuit 69 outputs the enable signals to the respective gates 70, 71, 72 and 73, when the phase signal indicates '1', '2', '3' and '4'. Accordingly, digital samples sampled at the respective four phases, are sent to averagers 75, 76, 77 and 78, respectively. The averagers 75, 76, 77 and 78 produce the burst data A, B, C and D by averaging the digital samples outputted by the respective gate 70, 71, 72 and 73. A reset-enable pulse generator 74 generates a reset-enable pulse, which is supplied to the averager 75, 76, 77 and 78, and the memories 79, 80, 81 and 82, at the end of the burst interval. Memories 79, 80, 81 and 82 hold the respective burst data A, B, C and D at the timing of the reset-enable signal, and at the same time, the averagers 75, 76, 77 and 78 reset data processing.

Figure 10:
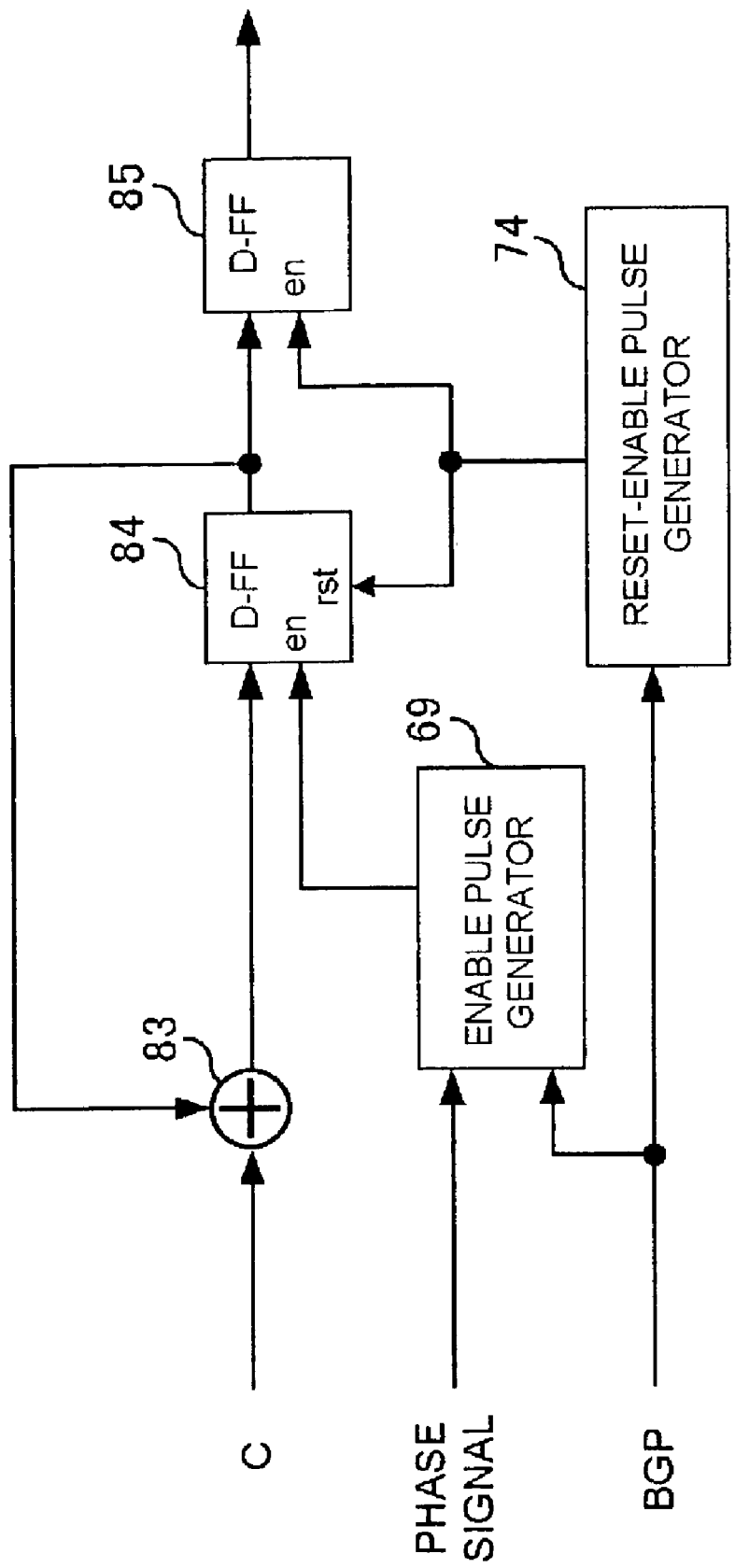

FIG. 10 is an alternative structure of the burst data generator 57, which produce one of the burst data A, B, C or D. An enable pulse generator 69 generates an enable pulse, which occurs when the phase signal indicates one of the four phases '1', '2', '3' or '4' during the burst interval. The D-FF 84 provides its output to an adder 83 in response to this enable pulse. Accordingly, the adder 83 produces a sum of digital samples of the burst signal at one of the four phases. The output of the adder 83 is also provided to a D-FF 85 via D-FF 84. A reset-enable pulse generator 74 generates a reset-enable pulse, which occurs at the end of the burst interval, and supplies it to the. D-FFs 84 and 85. The D-FF 85 holds the output of the D-FF 84 at the timing of the reset-enable pulse, thereby obtaining the sum produced by the adder 83. At the same time, the D-FF 84 resets data processing. The D-FF 85 produce one of the burst data A, B, C or D, by dividing the sum produced by the adder 83 by a number of the digital samples added to this sum. All of the four burst data A, B, C and D can be obtained by arranging four sets of the structure shown in FIG. 8.

Figure 11:
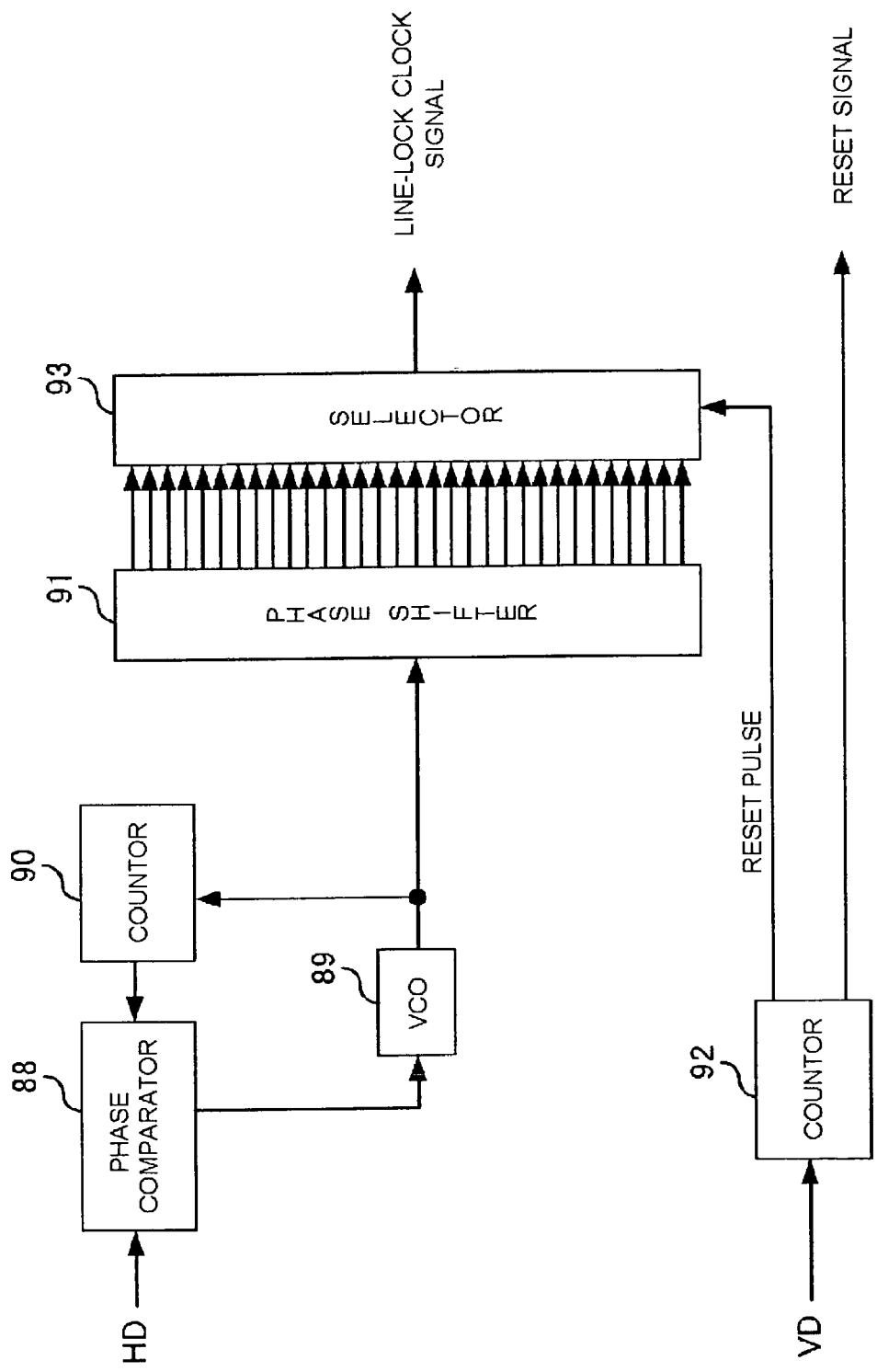

FIG. 11 is a block diagram illustrating a structure of the line-lock clock generator 52. A phase comparator 88 produces a dc error voltage, which is proportional to a phase difference between the horizontal sync signal HD and a pulse signal produced by a counter 90. A VCO 89 generates a clock signal whose frequency depends on this dc error voltage. The clock signal produced by the VCO 89 is supplied to the counter 90 and a phase shifter 91. The counter 90 generates a pulse signal by dividing a frequency of the clock signal produced by the VCO 89 so as to produce a 4 fsc clock signal, which is supplied to the phase comparator 88. Accordingly, the VCO 89 supplies 4 fsc clock signal which is synchronized to the horizontal sync signal HD to the phase shifter 91.

The phase shifter 91 provides phase shifts equal to a multiple of ⅟₃₂ period of the 4 fsc clock signal to the input, clock signal, thereby producing thirty-two patterns of 4 fsc clock signal. A counter 92 counts sync pulses included in the vertical sync signal VD and outputs a number of the counted synch pulses to a selector 93. The counter 92 resets counting and outputs the reset signal when thirty-two sync pulses are counted. This reset signal is sent to the burst amplitude detector 60 every thirty-two vertical periods.

The selector 93 selects one of a 4 fsc clock signal according to the count value of the counter 92, and outputs the selected clock signal as a line-lock clock signal. This means a phase of the line-lock clock shifts every vertical period by a multiple of ⅟₃₂ period of the line-lock clock signal. The reason that the line-lock clock signal is shifted in this manner is to enable the burst amplitude detector 60 to produce the burst amplitude E. The operation of the burst amplitude detector 60 will be described later.

Although the line-lock clock generator shown in FIG. 11 shifts the phase of the line-lock clock signal as discribed above, the invention is not limited to such a case. The phase shifter 91 may provide phase shift equal to a multiple of, for example, ⅟₁₆ period of the line-lock clock.

Figure 12:
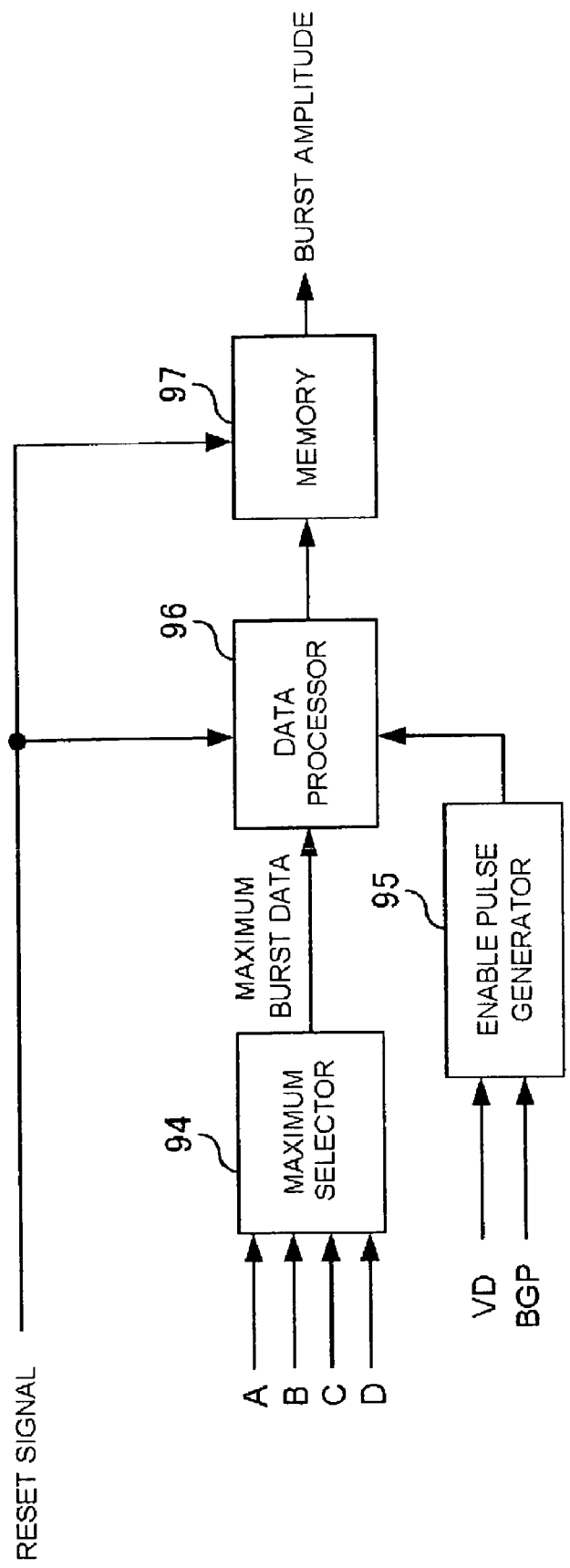

FIG. 12 is a block diagram illustrating a structure of the burst amplitude detector 60. The burst data A, B, C and D are sent to a maximum selector 94. The maximum selector 94 selects one of the four burst data A, B, C and D having maximum value as a maximum burst data. The maximum burst data is sent to a data processor 96. An enable pulse generator 95 generates an enable pulse, which occurs at the end of the burst interval, and supplies it to the data processor 96 sixty-four times per vertical period.

The data processor 96 calculates the burst amplitude based on the maximum burst data. The memory 97 holds the burst amplitude calculated by the data processor 96 at the timing of the reset signal, which is released by the counter 92 every thirty-two vertical periods.

Figure 13:
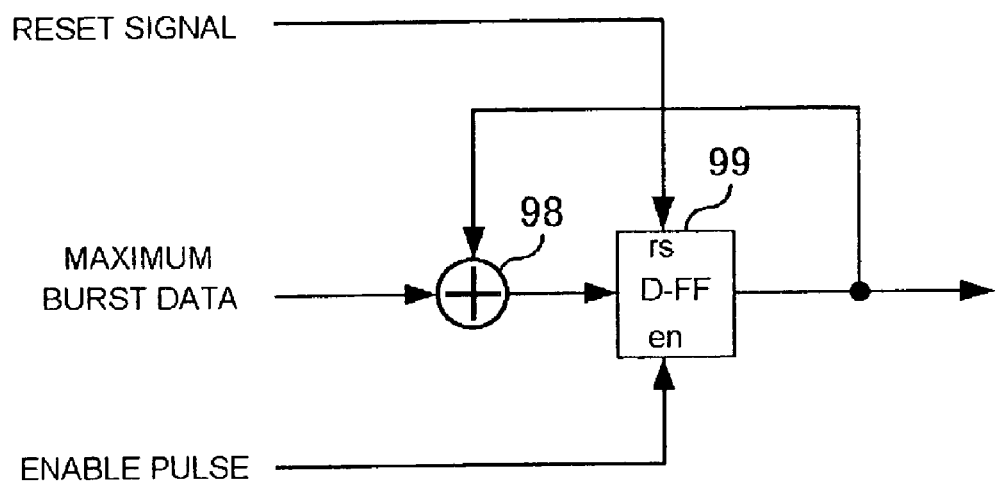
Figure 14:
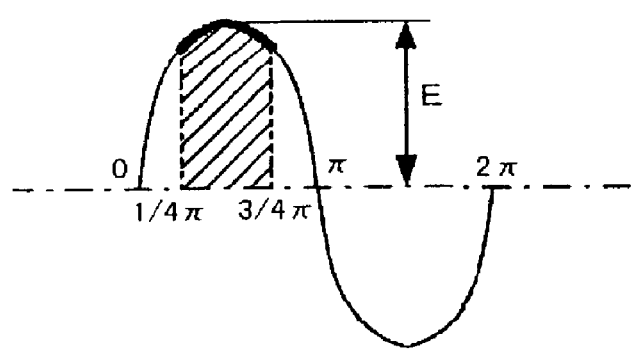

FIG. 13 is a block diagram illustrating a structure of the data processor 96. An adder 98 adds the maximum burst data selected by the maximum selector 94 and an output of a D-FF 99. The D-FF 99 feeds back its output to the adder 98, in response to the enable pulse generated sixty-four times per vertical period by the enable pulse generator 95. The D-FF 99 holds an output of the adder 98, in response to the reset signal released every thirty-two vertical periods by the counter 92. As a result, a sum of the sixty-four maximum burst data of thirty-two consecutive frames is obtained when the D-FF 99 receives the reset signal. The D-FF 99 discards the lowest 11 bits of the sum, and outputs the upper bits, which corresponds to a sum of thirty-two digital samples of the burst signals in a range of $\pi/4 < \theta < 3\pi/4$. This sum is equal to an area indicated by a hatched portion in FIG. 14, which calculated as follows:

$$\frac{\int_{\frac{1}{4}\pi}^{\frac{3}{4}\pi} E\sin\theta d\theta}{\left(\frac{3}{4}-\frac{1}{4}\right)\pi} = \frac{2\sqrt{2}}{\pi}E \cong 0.9E \quad (21)$$

Therefore, the burst amplitude (E) is calculated by dividing the output data of the D-FF 99 by 0.9 or multiplying by 1.11 which is the reciprocal of 0.9. The value of the amplitude of the burst signal may be varied to control a color gain.

According to the color demodulation device and the color demodulation method discussed above, the digital samples B-Y and R-Y can be obtained using the line-lock clock signal, which is not necessarily in phase with the burst signal.

Although a frequency of the line-lock clock is assumed to be four times the color subcarrier frequency (4 fsc) in the above description, the line-lock clock signal of two times the color subcarrier signal with 50% duty cycle may also be used. In this case, the AD converter 54 samples the composite video signal at both rising and trailing edges of the line-lock clock signal, reducing clock generating power. Furthermore, the line-lock clock frequency may be 4n multiple the color subcarrier frequency, where n is a natural number. By increasing the frequency of the line-lock clock signal, the amplitude of the burst signal is detected more accurately.

Figure 15:
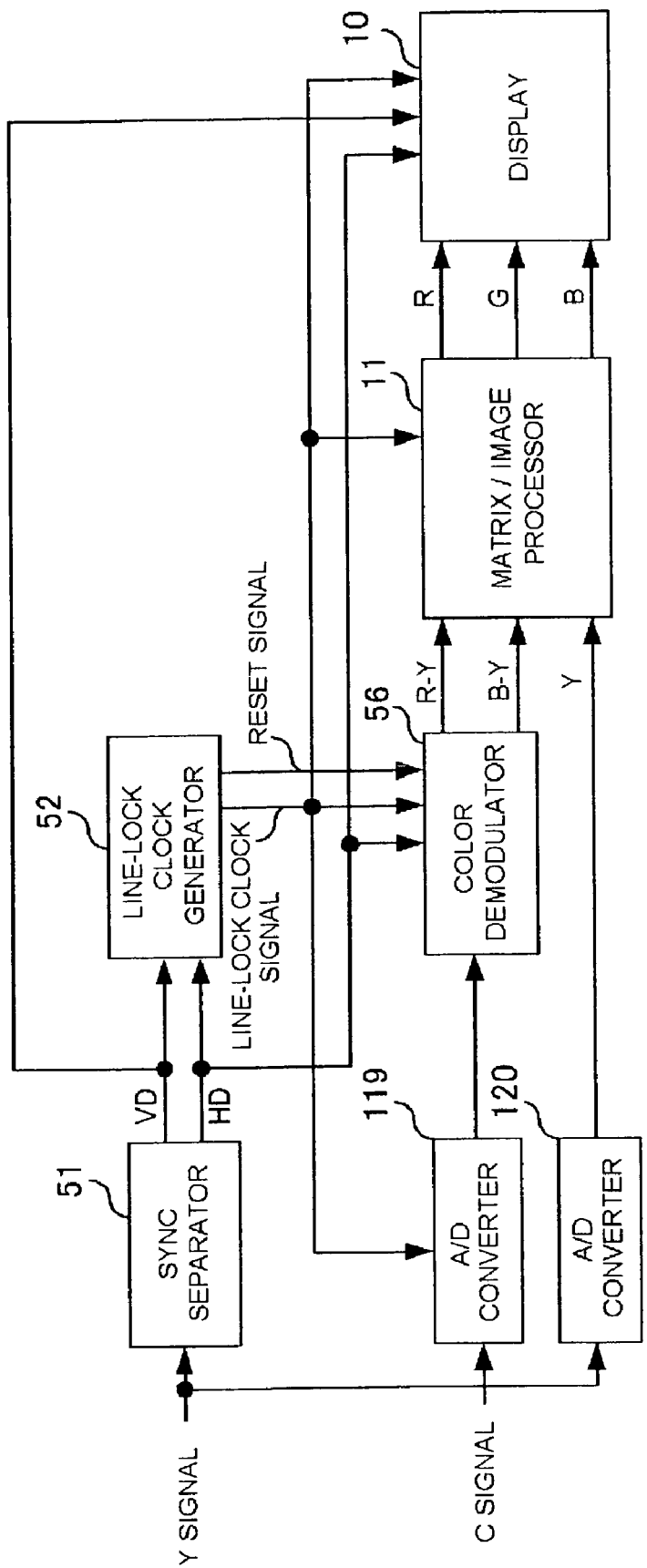
FIGS. 15 and 16 are block diagrams each showing an alternative structure of the first embodiment.
Figure 16:
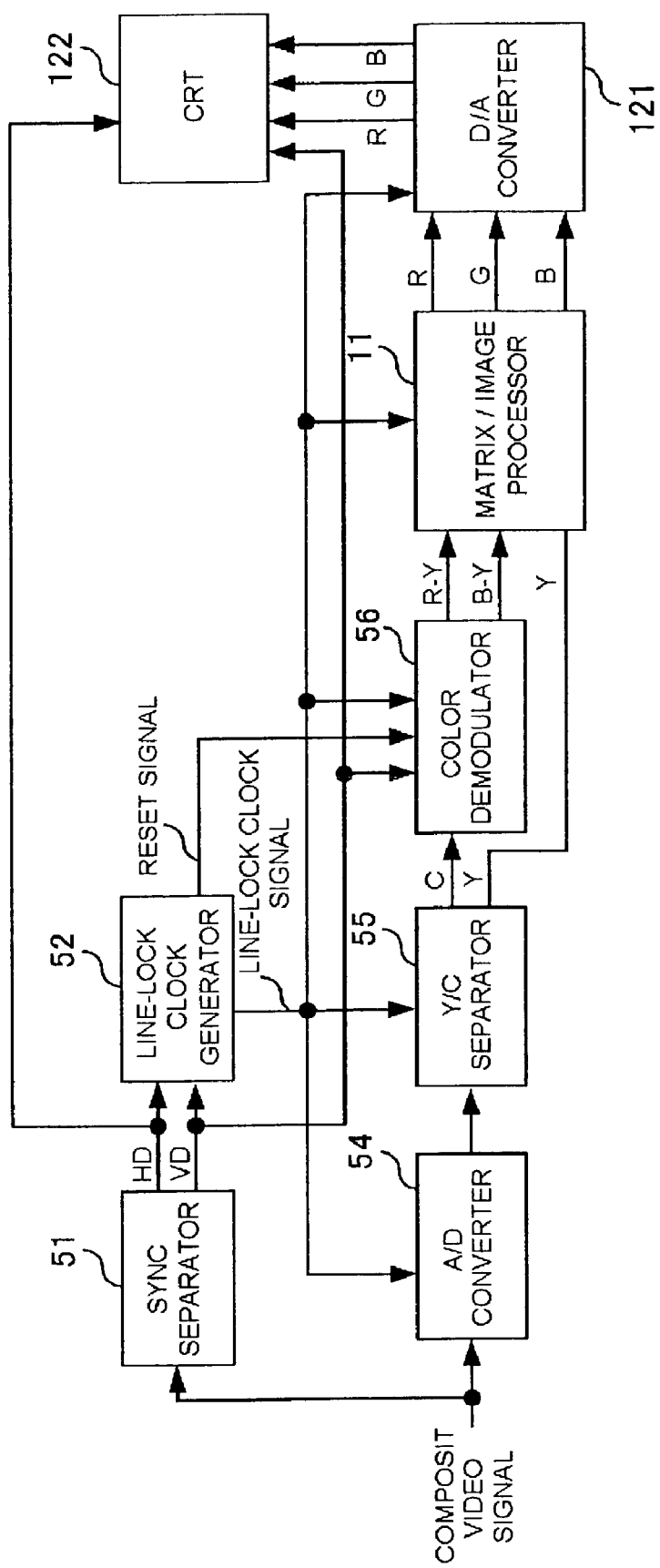

FIGS. 15 and 16 are block diagrams each illustrating alternative structure of an image display device according to the first embodiment. The image display device shown in FIG. 15 receives the luminance signal (Y signal) and the chrominance signal (C signal) separately. A sync Filter 51 extracts the horizontal sync signal HD and the vertical sync signal VD from the luminance signal. An AD converter 119 produces the digital samples Y. At the same time, an AD converter 120 produces the digital samples C. The AD converters 119 and 120 use the line-lock clock signal as a sampling clock to produce the digital samples Y and C. The image display device shown in FIG. 16 uses CRT 122 for displaying an image. A DA converter 121 provides R, G and B analog signals to the CRT 122.

Second Embodiment

The product EB can be obtained based on three of the products a1, a2, a3 and a4, which are associated with adjacent three phases. For example, two multiple of the product EB associated with the phase angle θ+180° is obtained by adding the three products a1, a2 and a3 as follows;

$$a1 + 2\times a2 + a3 = -EB\sin^2\theta - ER\sin\theta\cos\theta - \quad (22)$$
$$2EB\cos^2\theta + 2ER\sin\theta\cos\theta -$$
$$EB\sin^2\theta - ER\sin\theta\cos\theta$$
$$= -2EB(\sin^2\theta + \cos^2\theta)$$
$$= -2EB$$

Similarly, the product ER can be obtained based on three of the products b1, b2, b3 and b4 associated with adjacent three phases. For example, two multiple of the product ER associated with the phase angle θ+180° is obtained by adding the three products b1, b2 and b3 as follows;

$$b1 + 2\times b2 + b3 = -EB\sin\theta\cos\theta - ER\cos^2\theta + \quad (23)$$
$$2EB\sin\theta\cos\theta - 2ER\sin^2\theta +$$
$$-EB\sin\theta\cos\theta - ER\cos^2\theta$$
$$= -2ER(\sin^2\theta + \cos^2\theta)$$
$$= -2ER$$

By obtaining the product ER and EB based on the three of the products, the digital samples R-Y and B-Y are produced without "color deviation", where the digital samples R-Y and B-Y do not match with the digital sample Y, which in turn results in less clear image.

Figure 17:
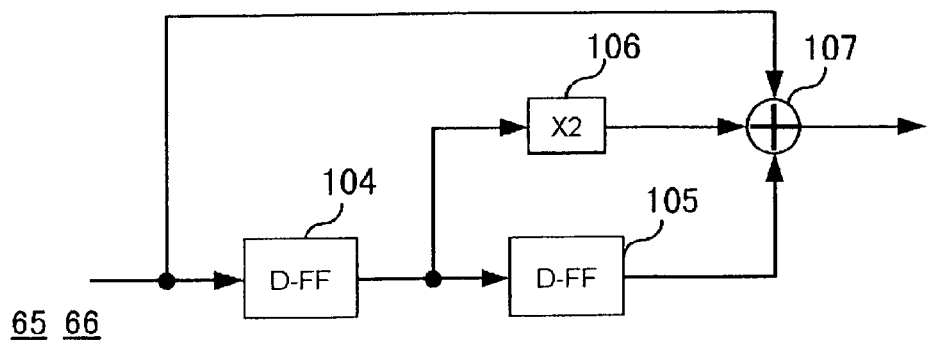
FIG. 17 is a block diagram illustrating a structure of each of low pass filters according to the second embodiment.

The operation discussed above can be performed by each of the LPFs 65 and 66 according to the second embodiment shown in FIG. 17. Each of the products a1, a2, a3 and a4, or b1, b2, b3 and b4 is provided to a D-FF 104 and an adder 107 from the multiplier 63, or 64. The D-FF 104 delays an input thereto by one line-lock clock period. The output of the D-FF 104 is provided to a D-FF 105 and a twofold multiplier 105. The D-FF 105 delays the output of the D-FF 104 by one line-lock clock period. A twofold multiplier 106 doubles an output of the D-FF 104. The adder 107 produces the two multiple of the product AR or AB by adding three input thereto.

The structure of each of the LPFs 65 and 66 is not limited to the one shown in FIG. 13. Any kind of filters, which provides zero gain to the 2 fsc and DC components, is employable as the LPFs 65 and 66.

Third Embodiment

Figure 18:
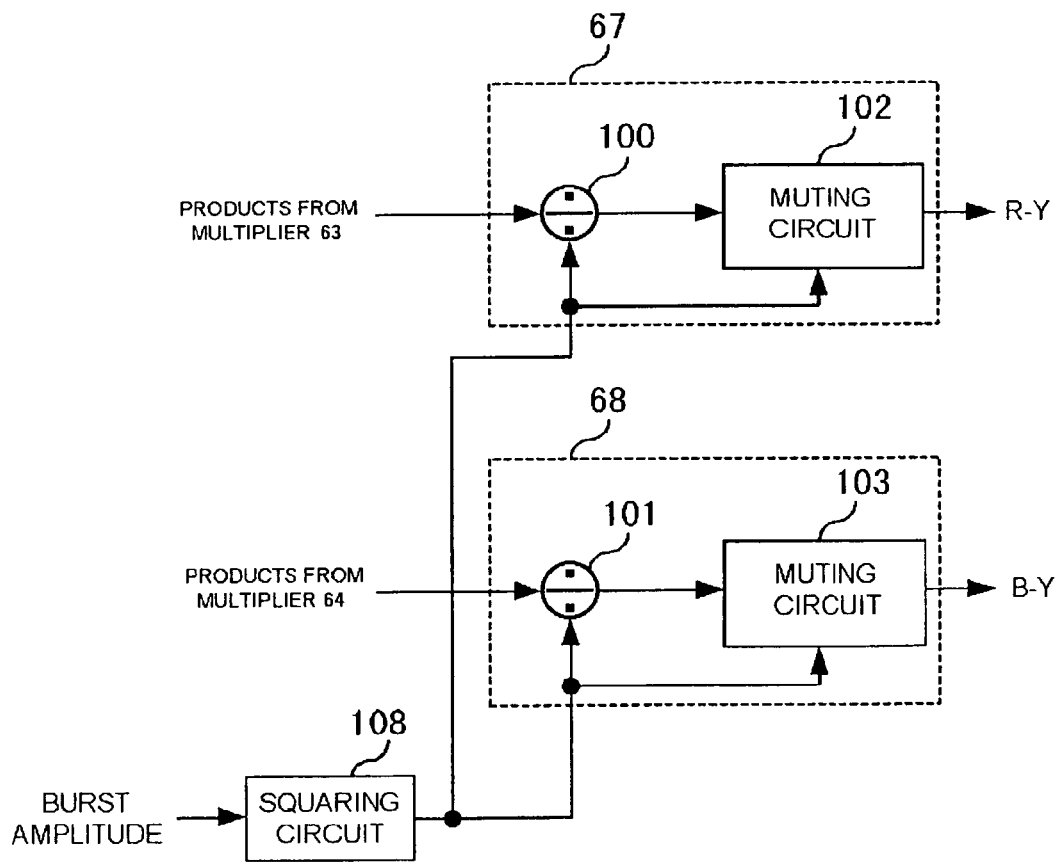
FIG. 18 is a block diagram illustrating a structure of amplitude adjusters according to the third embodiment.

FIG. 18 is a block diagram illustrating the amplitude adjusters 67 and 68 (see FIG. 5) according to the third embodiment. The amplitude adjuster shown in FIG. 18 further includes a squaring circuit 108, which squares the burst amplitude (E) provided by the burst amplitude detector 60. By squaring the burst amplitude, the digital samples R-Y and B-Y are normalized by the amplitude of the burst signal, which means the amplitudes of the digital samples R-Y and B-Y are kept in an appropriate range.

Fourth Embodiment

As shown in FIGS. 8 and 16, the amplitude adjusters 67 and 68 adjust amplitude of the digital samples R-Y and B-Y by dividing the products AR and AB by the burst amplitude. Therefore, The burst amplitude with extremely small value causes noise components in the R, G and B signals. Conversely, the burst amplitude with extremely large value results in the R, G and B signals with tint color. The burst amplitude detector 60 according to the fourth embodiment solves these problems by correcting the burst amplitude as follows.

Figure 19:
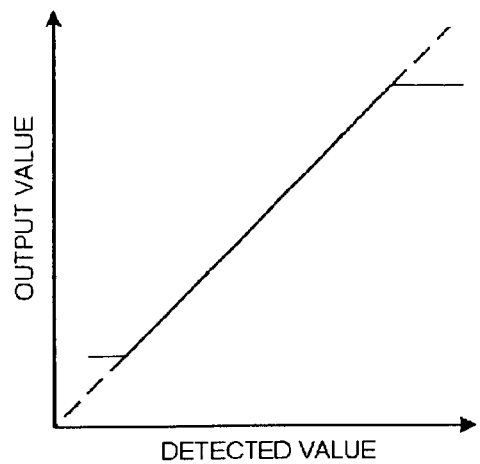
FIGS. 19, 20 and 21 are diagrams showing characteristics of the burst amplitude detector according to the fourth embodiment.
Figure 20:
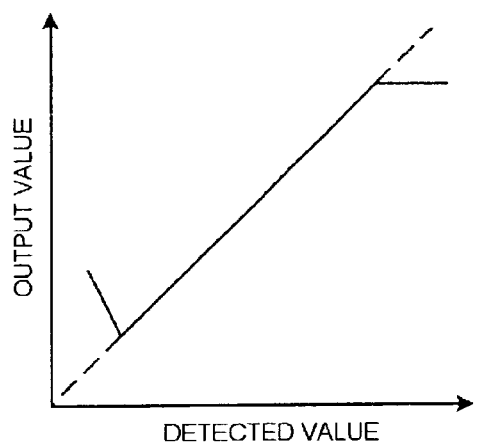
Figure 21:
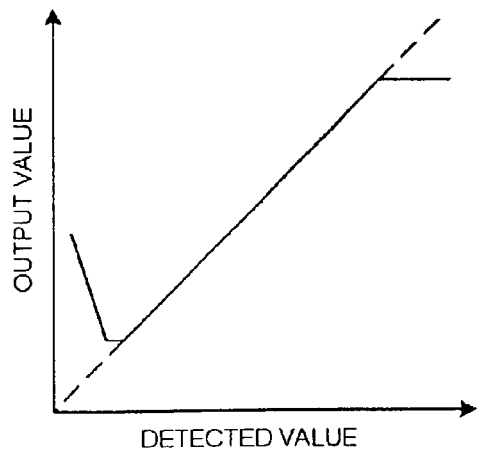

FIGS. 19, 20 and 21 are diagrams showing examples of output characteristics of the burst amplitude detector 60 according to the fourth embodiment. In FIGS. 19, 20 and 21, each of horizontal axes represents the detected value of the burst amplitude, and each of vertical axes represents an output value of the burst amplitude, which is provided to the amplitude adjusters 67 and 68. As shown in FIG. 19, by limiting the burst amplitude to a predetermined range, the amplitudes of the digital samples R-Y and B-Y are kept in appropriate range, thereby preventing noise components from being contained in the R, G and B signals. This noise can be prevented more effectively by increasing the burst amplitude when it becomes less than predetermined value as shown in FIG. 20. The output characteristic shown in FIG. 21, which is a combination of that of FIGS. 15 and 16 is also employable.

By correcting a value of the burst amplitude as discussed above, the amplitude of the digital samples R-Y and B-Y can be adjusted accurately, thereby improving a quality of colors represented by the R, G and B signals.

Fifth Embodiment

Figure 22:
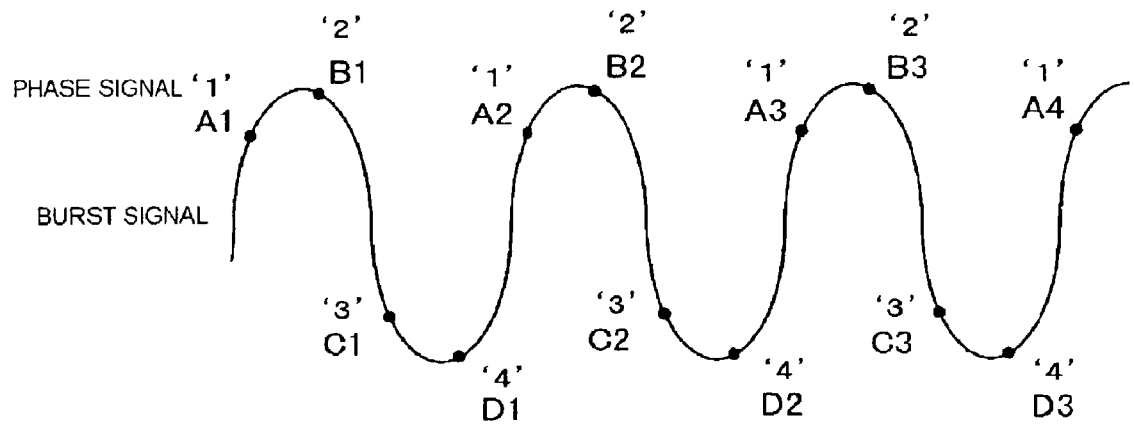
FIGS. 22 and 23 are diagrams showing signal waveforms for explaining the operation of the color demodulation devices according to the fifth and sixth embodiment, respectively.

FIG. 22 is a diagram for explaining an alternative method for detecting the burst amplitude in the burst data generator 57 (see FIGS. 9 and 10) according to the fifth embodiment. In FIG. 22, samples An, Bn, Cn and Dn (n=1, 2, 3 ...) indicated by black points correspond to the digital samples of the burst signal sampled at the respective four phases, i.e. θ, θ+90, θ+180, θ+270, at which the phase signal indicates '1', '2', '3' and '4'.

The burst data generator 57 according to the fifth embodiment determines the burst data A, B, C and D based on plurality of the respective samples An, Bn, Cn and Dn. For example, the burst data generator 57 selects a sample A3 as the burst data A, when A1<A3<A2. The burst data is obtained more accurately by averaging selected samples. For example, when A3<A1<A4<A2, the burst data A is calculated as (A1+A4)/2.

Sixth Embodiment

Figure 23:
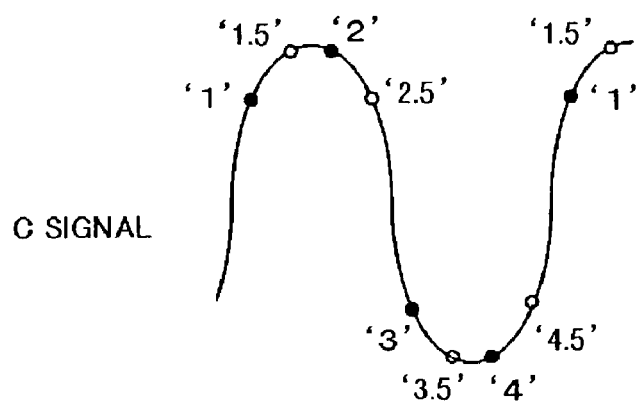

As mentioned in the first embodiment, the digital samples R-Y and B-Y can be produced more accurately by increasing the line-lock clock signal frequency by 4×n multiples of the color subcarrier frequency. A color modulator according to the sixth embodiment has the line-lock clock signal with frequency eight times the color subcarrier (8 fsc). FIG. 23 is a diagram showing the chrominance signal being sampled at frequency eight times the color subcarrier frequency (8 fsc). As shown in FIG. 23, the digital samples C are sampled at eight phase angles, θ, θ+45°, θ+90°, θ+135°, θ+180°, θ+225°, θ+270° and θ+315°, where the phase signal indicates '1', '1.5', '2', '2.5', '3', '3.5', '4' and '4.5'.

The color demodulator according to the sixth embodiment produces the digital samples R-Y and B-Y by adding two products associated with phase angles θ+315° and θ+45°, θ+45° and θ+135°, θ+135° and θ+225°, θ+225° and θ+315°, and θ+315° and θ+45°, thereby preventing the "color deviation" discussed in the second embodiment. Therefore, in this case, the burst data A, B, C and D are produced based on digital samples of the burst signal sampled at the phase angles θ+45°, θ+135°, θ+225° and θ+315°, respectively.

Seventh Embodiment

Each of the burst data generator 57 shown in FIGS. 9 and 10 produces the burst data by averaging digital samples of the burst signal included in the digital samples C. The seventh embodiment presents alternative way to produce the burst data.

Value of the respective burst data A, B, C and D of are given by following equations;

burst data $A = \sin\theta$ (23)

burst data $B = \sin(\theta+90°)$ (24)

burst data $C = \sin(\theta+180°)$ (25)

burst data $D = \sin(\theta+270°)$ (26), where θ is the phase difference between the line-lock clock signal and the burst signal ($0 \leq \theta < 2\pi$).

The burst data generator 57 produces the burst data A, B, C and D according to the equation (23)-(26), by adjusting θ so that the digital samples R-Y and B-Y are modulated correctly. Users may control these operations, which is performed by the burst data generator 57, by observing reference color in a reproduced image.

The burst data generator 57 according to the seventh embodiment can be formed with a microcomputer, which calculates value of the respective burst data by using the equation (23)-(26). It is possible to use the digital samples C including at least one cycle of the burst signal as the burst data, since the color subcarrier frequency is much higher than that of the chrominance signal.

Eighth Embodiment

Figure 25:
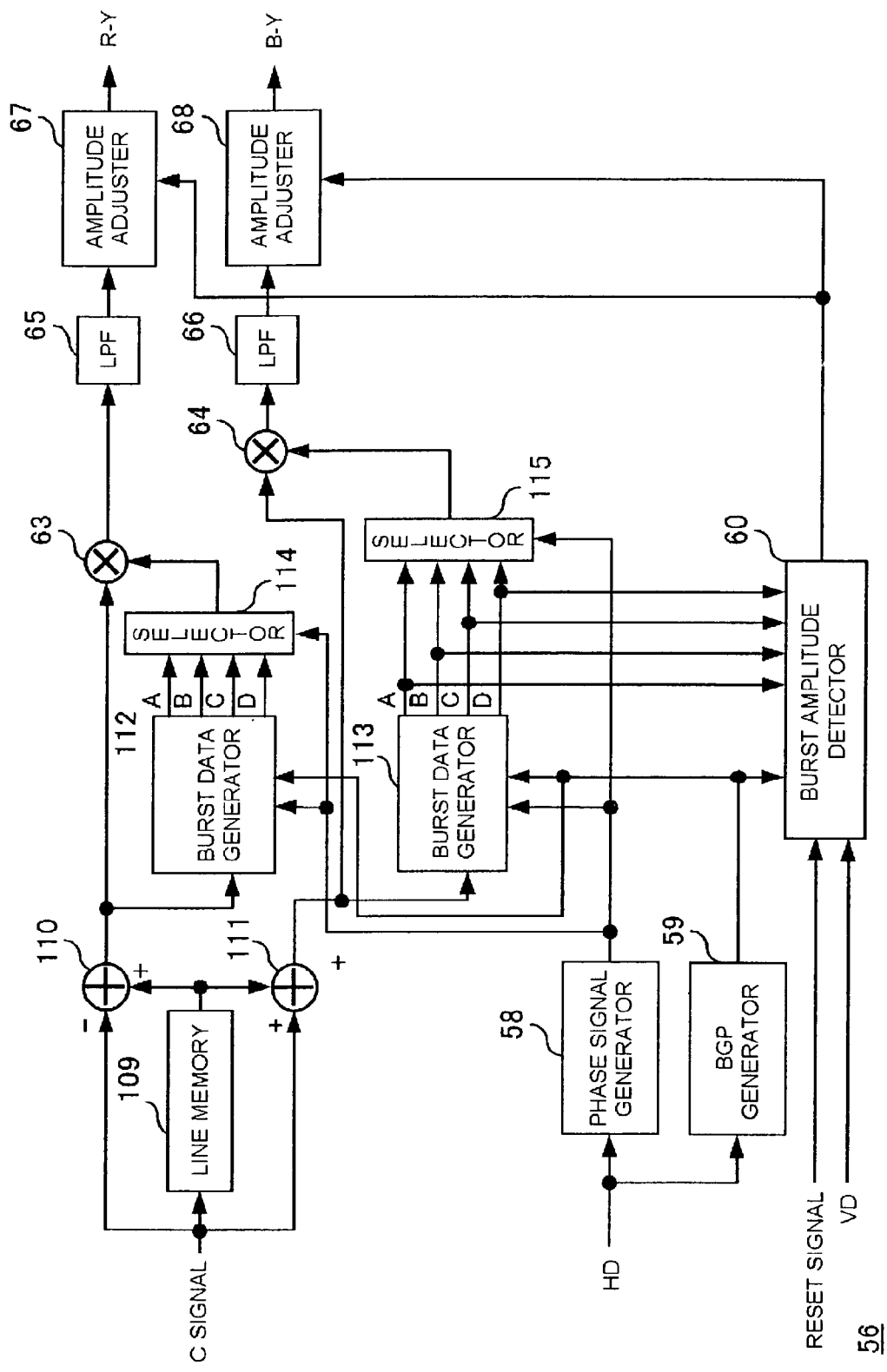
FIG. 25 is a block diagram illustrating a structure of an image display device including a color demodulation device according to the eighth embodiment.

FIG. 25 is a block diagram illustrating a structure of an image display device according to the eighth embodiment, which includes the color demodulation device according to each of the embodiments described above. As shown in FIG. 25, the image display device according to the eighth embodiment further includes a line memory 110, adders 110 and 111, and two sets of the burst data generator 112 and 111. The image display device shown in FIG. 21 is directed to the PAL system.

Figure 24:
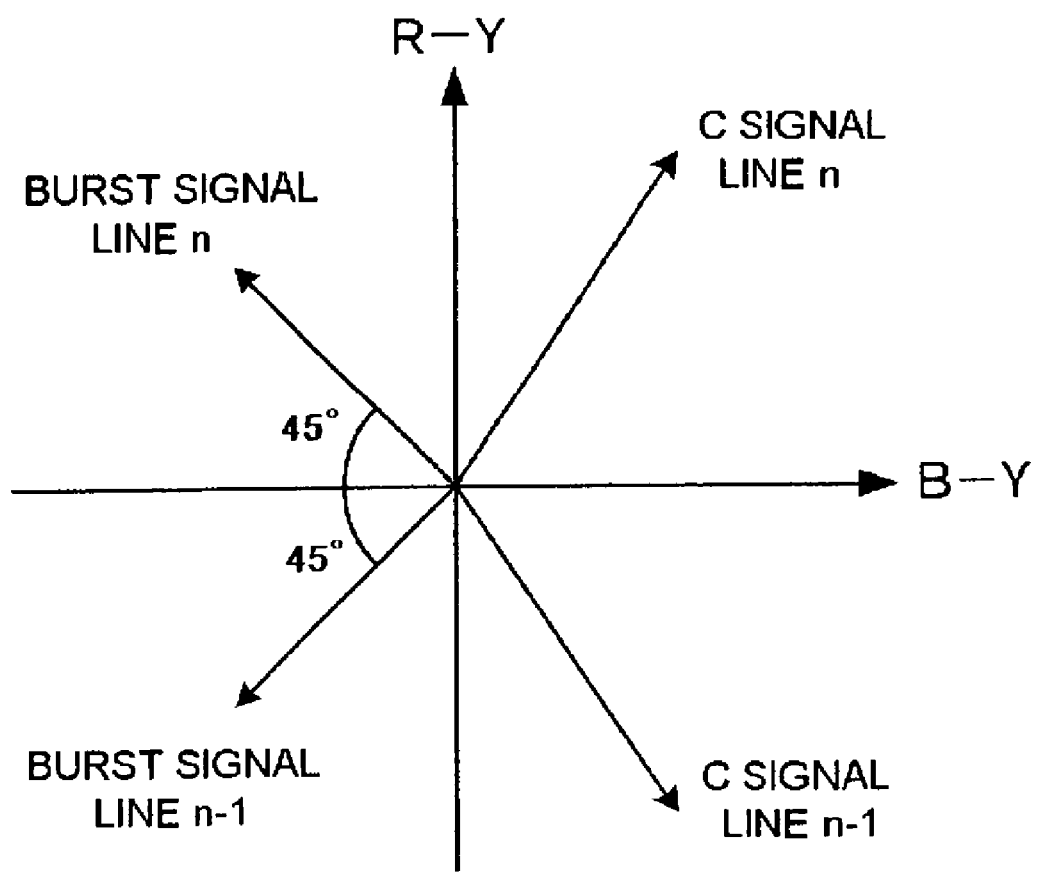
FIG. 24 is a vector diagram useful for understanding the operation of the color demodulation device according to the eighth embodiment.

FIG. 24 is a vector diagram showing a phase relationship among the burst signal, the R-Y and B-Y signals and the chrominance signal in the PAL system. As shown in FIG. 24, the burst signals of two adjacent lines n and n-1 are 90° out of phase.

Therefore, the burst signals 180° out of phase with respect to the B-Y signal is obtained by adding two adjacent lines n and n-1, and the burst signal 180° out of phase with respect to the R-Y signal is obtained by subtracting the line n from the line n-1.

The adder 110 subtracts the digital sample C of the line n-1 from that of the line n provided by the line memory 109, thereby producing digital samples corresponding to the burst signal 180° out of phase with respect to the R-Y signal. At the same time, the adder 111 adds the digital sample C of the line n+1 and that of the line n, thereby producing digital samples corresponding to the burst signal 180° out of phase with respect to the B-Y signal. The burst data generators 112 and 113 produce the burst data A, B, C and D based on the digital samples produced by the adder 110 and 111.

The structure of other parts and operations thereof are the same as each of the embodiments described above.

Figure 26:
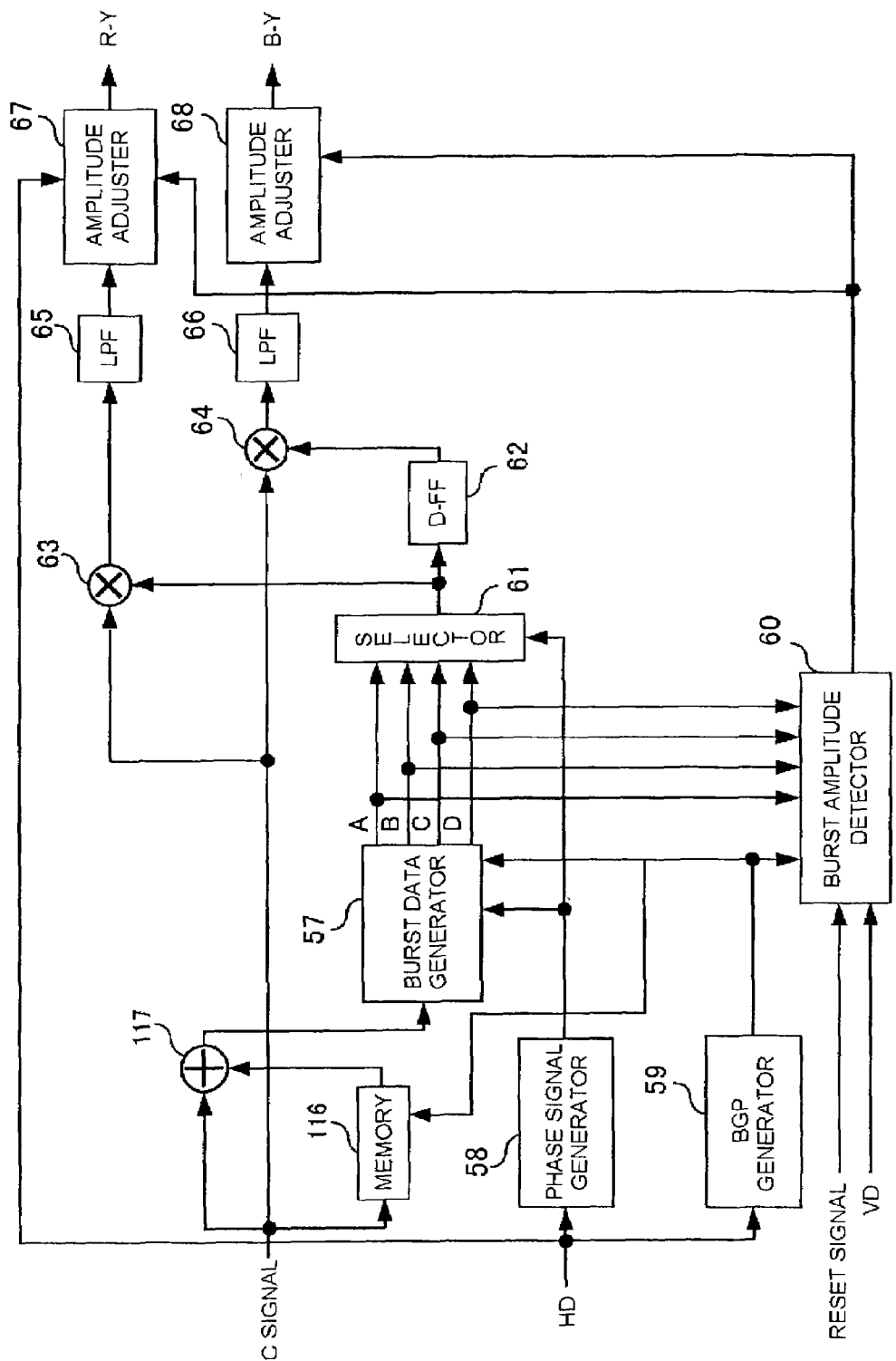
FIG. 26 is a block diagram illustrating an alternative structure of the image display device according to the eighth embodiment.

FIG. 26 is a block diagram illustrating another structure of an image display device according to the eighth embodiment. A memory 116 holds digital samples of the burst signal and output them to an adder 117 after one horizontal period. The adder 117 adds the digital samples of the burst signal and that of after one horizontal period, thereby producing digital samples corresponding to the burst signal 180° out of phase with the R-Y signal. The burst data generator 57 produces the burst data A, B, C and D according to the digital samples produced by the adder 117. As shown in FIG. 24, in the PAL system, the chrominance signal varies its polarity for each line. Therefore, an amplitude adjuster 118 changes polarity of an output of the LPF 65.

What is claimed is:

1. A color demodulation device comprising:
   an AD converter for sampling a chrominance signal included in a television signal at a frequency 4×n (n is a natural number) times a color subcarrier frequency, thereby producing digital samples of the chrominance signal;
   a phase signal generator for generating a phase signal for identifying phases of a burst signal and color subcarrier signals modulated by respective B-Y and R-Y signals included in the chrominance signal;
   a burst data generator for producing burst data corresponding to digital samples of the burst signals which have predetermined phase relationships with the respective color subcarrier signals according to the phase signal;
   a selector for selectively outputting the generated burst data according to the phase signal;
   a multiplier for producing products of the selected burst data and the digital samples of the chrominance signal; and
   a low pass filter for producing digital samples of the respective R-Y and BY signals from the products.

2. The color demodulation device in accordance with claim 1 wherein the burst data corresponds to the digital samples of the burst data, which are in phase or 180° out of phase with the respective color subcarrier signals.

3. The color demodulation device in accordance with claim 1 further comprising:
   a clock generator for generating a line-lock claimock signal having the frequency 4×n (n is a natural number) times the color subcarrier frequency and being synchronized with a horizontal sync signal, wherein the line-lock claimock signal serves as a sampling claimock for sampling the chrominance signal.

4. The color demodulation device in accordance with claim 1 further comprising:
   a clock generator generating a clock signal having a frequency two times the color subcarrier frequency and a 50% duty ratio, the clock signal being synchronized with the horizontal sync signal, wherein the clock signal serves as a sampling clock for sampling the chrominance signal.

5. The color demodulation device in accordance with claim 1 wherein the low pass filter produces each of the digital samples of the respective R-Y and B-Y signals from multiple of the products associated with adjacent phases.

6. The color demodulation device in accordance with claim 4, wherein the low pass filter produces each of the digital samples of the respective R-Y and B-Y signals from three of the products associated with adjacent phases.

7. The color demodulation device in accordance with claim 1 further comprising:
   a burst amplitude detector for detecting an amplitude of the burst signal, and
   an adjuster for adjusting amplitudes of the digital samples of the R-Y and B-Y signals in accordance with the amplitude of the burst signal detected by the burst amplitude detector.

8. The color demodulation device in accordance with claim 1, wherein the burst data generator produces the burst data based on the digital samples of the burst data included in the digital samples of the chrominance data.

9. The color demodulation device in accordance with claim 1, wherein the burst data generator produces the burst data based on four sample values A, B, C and D obtained according to following equations;

$A = \sin \theta$ $B = \sin (\theta + 90°)$ $C = \sin (\theta + 180°)$ $D = \sin (\theta + 270°)$, where $0° \leqq \theta < 360°$.

10. The color demodulation device in accordance with claim 1, wherein the burst data is produced according to burst signals included in the chrominance signal representing two lines.

11. An image display device including a color demodulation device in accordance with claim 1.

12. A color demodulation method comprising:
    sampling a chrominance signal included in a television signal at a frequency 4×n (n is a natural number) times a color subcarrier frequency, thereby producing digital samples of the chrominance signal,
    generating a phase signal for identifying phases of a burst signal and color subcarrier signals modulated by respective B-Y and R-Y signals included in the chrominance signal;
    producing burst data corresponding to digital samples of the burst signals which have predetermined phase relationships with the respective color subcarrier signals according to the phase signal;
    selectively outputting the produced burst data according to the phase signal; and
    producing digital samples of the respective R-Y and B-Y signals from products obtained by multiplying the digital samples of the chrominance signal by the selected burst data.

13. The color demodulation method in accordance with claim 12 wherein the burst data corresponds to the digital samples of the burst data which are in phase or 180° out of phase with the respective color subcarrier signals.

14. The color demodulation method in accordance with claim 12, further comprising:
    generating a line-lock clock signal having the frequency 4×n (n is a natural number) times the color subcarrier frequency and being synchronized with a horizontal sync signal, wherein the line-lock clock signal serves as a sampling clock for sampling the chrominance signal.

15. The color demodulation method in accordance with claim 12 wherein each of the digital samples of the respective R-Y and B-Y signals are produced based on multiple of the products associated with adjacent phases.

16. The color demodulation method in accordance with claim 14 further comprising:
    detecting an amplitude of the burst signal, and
    adjusting amplitudes of the digital samples of the R-Y and B-Y signals in accordance with the amplitude of the burst signal detected by the burst amplitude detector.

17. The color demodulation method in accordance with claim 12, wherein the burst data are produced based on the digital samples of the burst data included in the digital samples of the chrominance data.

18. The color demodulation method in accordance with claim 12, wherein the burst data are produced according to burst signals included in the chrominance signal representing two lines.

* * * * *